(12) United States Patent
Yamanaka et al.

(10) Patent No.: US 11,722,645 B2
(45) Date of Patent: Aug. 8, 2023

(54) IMAGE-CAPTURING APPARATUS, IMAGE PROCESSING METHOD, AND PROGRAM

(71) Applicants: Sony Group Corporation, Tokyo (JP); Sony Semiconductor Solutions Corporation, Kanagawa (JP)

(72) Inventors: Go Yamanaka, Kanagawa (JP); Takuya Yamaguchi, Tokyo (JP); Yasuhiro Yukawa, Kanagawa (JP)

(73) Assignees: Sony Group Corporation, Tokyo (JP); Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/288,428

(22) PCT Filed: Oct. 18, 2019

(86) PCT No.: PCT/JP2019/041036
§ 371 (c)(1),
(2) Date: Apr. 23, 2021

(87) PCT Pub. No.: WO2020/090511
PCT Pub. Date: May 7, 2020

(65) Prior Publication Data
US 2021/0400241 A1    Dec. 23, 2021

(30) Foreign Application Priority Data
Oct. 31, 2018 (JP) .................. 2018-204836

(51) Int. Cl.
*H04N 7/18* (2006.01)
*B60R 1/00* (2022.01)
*H04N 23/80* (2023.01)

(52) U.S. Cl.
CPC .............. *H04N 7/183* (2013.01); *B60R 1/00* (2013.01); *H04N 23/80* (2023.01);
(Continued)

(58) Field of Classification Search
CPC ... B60R 1/00; B60R 2300/10; B60R 2300/20; B60R 2300/30; B60R 2300/8066; H04N 5/23229; H04N 7/183
(Continued)

(56) References Cited

U.S. PATENT DOCUMENTS 10,868,981 B2 * 12/2020 Mabuchi ................ B60R 11/02
2003/0169902 A1 * 9/2003 Satoh ..................... G08G 1/166
348/E7.086
(Continued)

FOREIGN PATENT DOCUMENTS

| CN | 107848465 A | 3/2018 |
| CN | 109076163 A | 12/2018 |

(Continued)

OTHER PUBLICATIONS

International Search Report and English translation thereof dated Dec. 24, 2019 in connection with International Application No. PCT/JP2019/041036.
(Continued)

*Primary Examiner* — On S Mung
(74) *Attorney, Agent, or Firm* — Wolf, Greenfield & Sacks, P.C.

(57) ABSTRACT

The present technology relates to, for example, an image-capturing apparatus, an image processing method, and a program that make it possible to suppress an increase in costs.
A controller performs an extraction control for extracting a first image and a second image from a captured image captured by an image sensor that performs image-capturing, the first image being displayed on a first display section, the second image being displayed on a second display section. A data amount adjuster adjusts data amounts of the first image and the second image according to vehicle informa-
(Continued)

tion acquired from a vehicle. For example, the present technology is applicable to a viewing system that displays an image of a region behind a vehicle.

14 Claims, 17 Drawing Sheets

(52) U.S. Cl.
CPC ....... *B60R 2300/10* (2013.01); *B60R 2300/20* (2013.01); *B60R 2300/30* (2013.01); *B60R 2300/8066* (2013.01)

(58) Field of Classification Search
USPC ......................................................... 348/148
See application file for complete search history.

(56) References Cited

U.S. PATENT DOCUMENTS

| 2008/0165861 | A1* | 7/2008 | Wen ..................... H04N 19/176 |
| | | | 375/E7.176 |
| 2009/0079585 | A1* | 3/2009 | Chinomi .................. B60R 1/04 |
| | | | 348/E7.086 |
| 2011/0193961 | A1 | 8/2011 | Peterson |
| 2015/0325120 | A1* | 11/2015 | Cho ....................... G08G 1/166 |
| | | | 348/149 |
| 2016/0137126 | A1* | 5/2016 | Fürsich ................ H04N 13/239 |
| | | | 348/148 |
| 2016/0263997 | A1* | 9/2016 | Mizutani ................. G06T 11/60 |
| 2017/0249842 | A1 | 8/2017 | Cho |
| 2018/0134217 | A1 | 5/2018 | Peterson et al. |
| 2018/0249066 | A1 | 8/2018 | Katsumata |
| 2019/0124277 | A1 | 4/2019 | Mabuchi |
| 2019/0248288 | A1 | 8/2019 | Oba |
| 2021/0400209 | A1 | 12/2021 | Yamanaka et al. |

FOREIGN PATENT DOCUMENTS

| CN | 113039778 A | 6/2021 |
| EP | 3451651 A1 | 3/2019 |
| EP | 3 487 122 A4 | 5/2019 |
| EP | 3487172 A1 | 5/2019 |
| JP | H11-312300 A | 11/1999 |
| JP | 2006-254318 A | 9/2006 |
| JP | 2018-012439 A | 1/2018 |
| WO | WO 2017/187811 A1 | 11/2017 |
| WO | WO 2018/012299 A1 | 1/2018 |

OTHER PUBLICATIONS

International Written Opinion and English translation thereof dated Dec. 24, 2019 in connection with International Application No. PCT/JP2019/041036.
International Preliminary Report on Patentability and English translation thereof dated May 14, 2021 in connection with International Application No. PCT/JP2019/041036.
Extended European Search Report dated Nov. 16, 2021 in connection with European Application No. 19880646.5.

* cited by examiner

Highest-resolution image

- Resolution Rmax
- Frame rate 60 fps

BM image

- Resolution RBM (≤ Rmax/2)

RV image

- Resolution RRV (≤ RBM)

FIG.7

BM image

- Resolution RBM
- YUV 4:2:2 format
- 8 bits per pixel

RV image

- Resolution RRV
- YUV 4:2:2 format
- 8 bits per pixel

FIG.8

IMAGE-CAPTURING APPARATUS, IMAGE PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/041036, filed in the Japanese Patent Office as a Receiving Office on Oct. 18, 2019, which claims priority to Japanese Patent Application Number JP2018-204836, filed in the Japanese Patent Office on Oct. 31, 2018, each of which is hereby incorporated by reference in its entirety.

TECHNICAL FIELD

The present technology relates to an image-capturing apparatus, an image processing method, and a program. In particular, the present technology relates to, for example, an image-capturing apparatus, an image processing method, and a program that make it possible to suppress an increase in costs.

BACKGROUND ART

For example, a viewing system in which a camera that is an image-capturing apparatus is installed in the rear of a vehicle such as an automobile and an image of a region behind the vehicle that is captured using the camera is displayed, is proposed.

Examples of the image of a region behind a vehicle that is provided by the viewing system include an image of a region situated further rearward than a region just behind the rear of the vehicle, and an image of the region just behind the rear of the vehicle.

Here, the image of a region situated further rearward than a region just behind the rear of a vehicle is, for example, an image that corresponds to an image seen in a Class I mirror, which is a so-called interior rearview mirror, and is hereinafter also referred to as a back mirror (BM) image. Further, the image of a region just behind the rear of a vehicle is an image of the rear of the vehicle and a region just behind the rear of the vehicle, and is hereinafter also referred to as a rearview (RV) image.

The specifications, that is, angles of view and optical-axis directions that are necessary to capture a BM image and an RV image are different. Thus, the BM image and the RV image are respectively captured using different cameras. Therefore, in order to display a BM image and an RV image in the viewing system, there is a need to provide, in the rear of a vehicle, two cameras that are a camera used to capture the BM image and a camera used to capture the RV image.

In recent years, there is a need to capture a BM image and a RV image using a single camera in order to, for example, reduce costs.

For example, Patent Literature 1 discloses a camera in which an angle of view and an optical-axis direction are changed by a PTZ (pan, tilt, and zoom) operation being performed. In the camera disclosed in Patent Literature 1, the PTZ operation makes it possible to switch between capturing of a distant image of a range distant from a vehicle and capturing of a nearby image of a range close to the vehicle.

CITATION LIST

Patent Literature

Patent Literature 1: Japanese Patent Application Laid-open No. 11-312300

DISCLOSURE OF INVENTION

Technical Problem

The camera disclosed in Patent Literature 1 makes it possible to switch between output of a distant image corresponding to a BM image and output of a nearby image corresponding to an RV image. However, it is difficult to simultaneously output the distant image and the nearby image using the camera disclosed in Patent Literature 1.

Further, there is a restriction on a vehicle transmission bandwidth that can be used to transmit data in a vehicle. Thus, even if it is possible to simultaneously output a distant image corresponding to a BM image and a nearby image corresponding to an RV image, it will be difficult to simultaneously transmit the distant image and the nearby image to display those images.

Although an increase in vehicle transmission bandwidth makes it possible to simultaneously transmit a distant image and a nearby image, the increase in vehicle transmission bandwidth results in increasing the costs for the viewing system.

The present technology has been made in view of the circumstances described above, and is intended to make it possible to suppress an increase in costs.

Solution to Problem

An image-capturing apparatus or a program according to the present technology is an image-capturing apparatus, or a program that causes a computer to operate as the image-capturing apparatus, the image-capturing apparatus including an image sensor that performs image-capturing; a controller that performs an extraction control for extracting a first image and a second image from a captured image captured by the image sensor, the first image being displayed on a first display section, the second image being displayed on a second display section; and a data amount adjuster that adjusts data amounts of the first image and the second image according to vehicle information acquired from a vehicle.

An image processing method according to the present technology includes performing an extraction control for extracting a first image and a second image from a captured image captured by an image sensor that performs image-capturing, the first image being displayed on a first display section, the second image being displayed on a second display section; and adjusting data amounts of the first image and the second image according to vehicle information acquired from a vehicle.

In an image-capturing apparatus, an image processing method, and a program according to the present technology, an extraction control for extracting a first image and a second image from a captured image captured by an image sensor that performs image-capturing is performed, the first image being displayed on a first display section, the second image being displayed on a second display section. Then, data amounts of the first image and the second image are adjusted according to vehicle information acquired from a vehicle.

Note that the image-capturing apparatus may be an independent apparatus or an internal block included in a single apparatus.

Further, the program can be provided by being transmitted through a transmission medium or by being stored in a recording medium.

BRIEF DESCRIPTION OF DRAWINGS

FIG. 7 illustrates an example of an image that can be output by the image sensor 32.

FIG. 8 is a diagram describing an example of a vehicle transmission bandwidth that can be used for data transmission in the vehicle 10.

MODE(S) FOR CARRYING OUT THE INVENTION

<Example of Configuration of Vehicle Including Viewing System>

Figure 1:
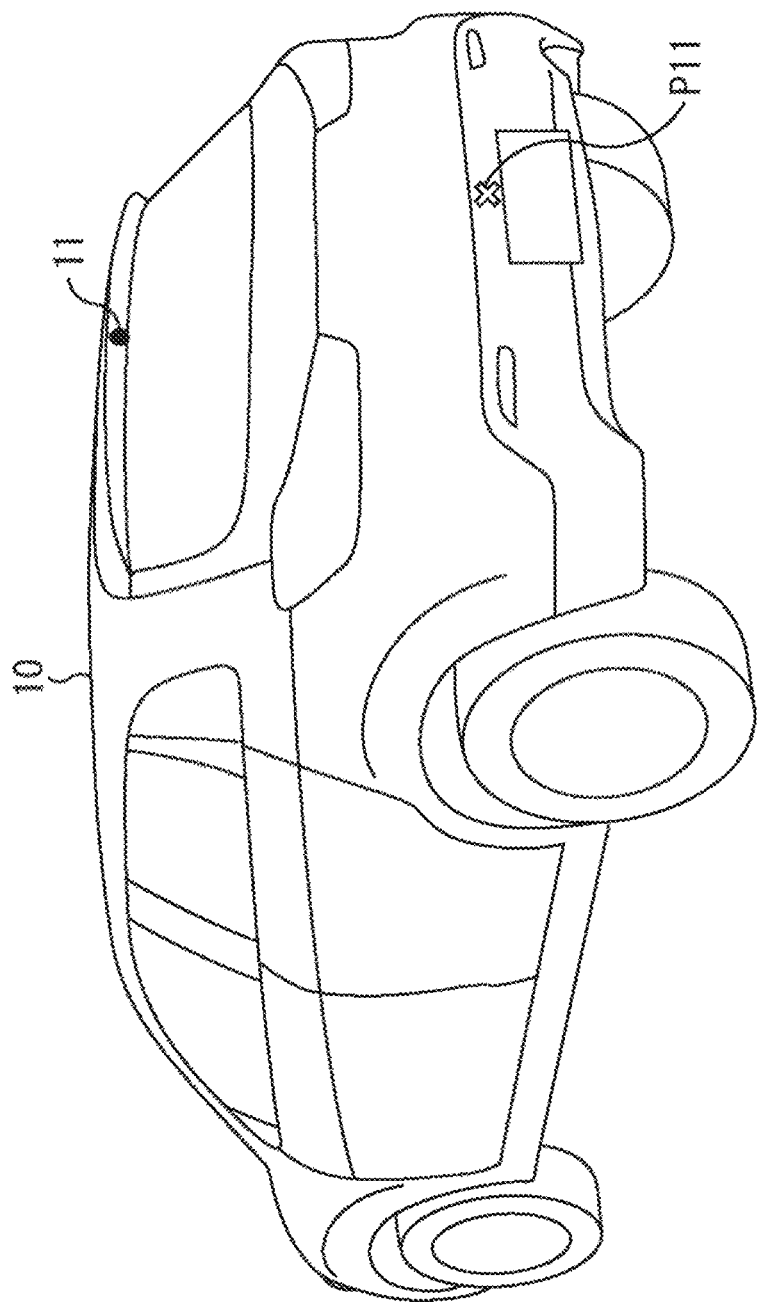
FIG. 1 is a perspective view illustrating an external configuration example of a vehicle 10 that includes a viewing system according to the present technology.

FIG. 1 is a perspective view illustrating an example of a configuration of an appearance of a vehicle 10 that includes a viewing system to which the present technology is applied.

For example, a camera unit 11 that is an image-capturing apparatus used to capture an image of a region behind the (four-wheeled) vehicle 10 is installed in the rear of the vehicle 10. In FIG. 1, the camera unit 11 is installed above a rear window of the vehicle 10.

The camera unit 11 is a wide-angle camera unit such that it is possible to capture an image in which both a range corresponding to a BM image (a first image) and a range corresponding to an RV image (a second image) appear. Further, the camera unit 11 is a high-resolution camera unit such that a distant subject is apparent in the BM image. Thus, the camera unit 11 is capable of capturing a wide-angle, high-resolution image.

Note that, in the camera unit 11, a BM image and an RV image are extracted from an image captured by the camera unit 11 (hereinafter also referred to as a captured image). This will be described later.

The camera unit 11 is installed in a state in which the orientation of the optical axis has been adjusted, such that the BM image includes an image of a state of a region situated further rearward than a region just behind the rear of the vehicle 10, and such that the RV image includes an image of states of the rear of the vehicle 10 and the region just behind the rear of the vehicle 10, the state of the region situated further rearward than the region just behind the rear of the vehicle 10 being a state that can be observed using an interior rearview mirror (a Class I mirror in Regulation No. 46 defined by the United Nations Economic Commission for Europe <UNECE>) when the interior rearview mirror is installed in the vehicle 10.

Thus, the BM image is an image of a state of a region situated further rearward than a region just behind the rear of the vehicle 10, the state being a state that can be observed using an interior rearview mirror when the interior rearview mirror is installed in the vehicle 10. Further, the RV image is an image of states of the rear of the vehicle 10 and the region just behind the rear of the vehicle 10. The RV image is particularly useful when the vehicle 10 is traveling backward, since a region just behind the rear of the vehicle 10 that is a blind spot of the interior rearview mirror appears in the RV image. Further, the RV image can be used to generate an overhead image obtained when the vehicle 10 is viewed from above.

Note that the camera unit 11 is not limited to being installed above the rear window of the vehicle 10 as long as it is possible to capture a captured image from which the BM image and the RV image described above can be extracted. For example, in addition to being installed above the rear window of the vehicle 10, the camera unit 11 may be installed at, for example, a position P11 above a license plate situated in the rear of the vehicle 10.

Figure 2:
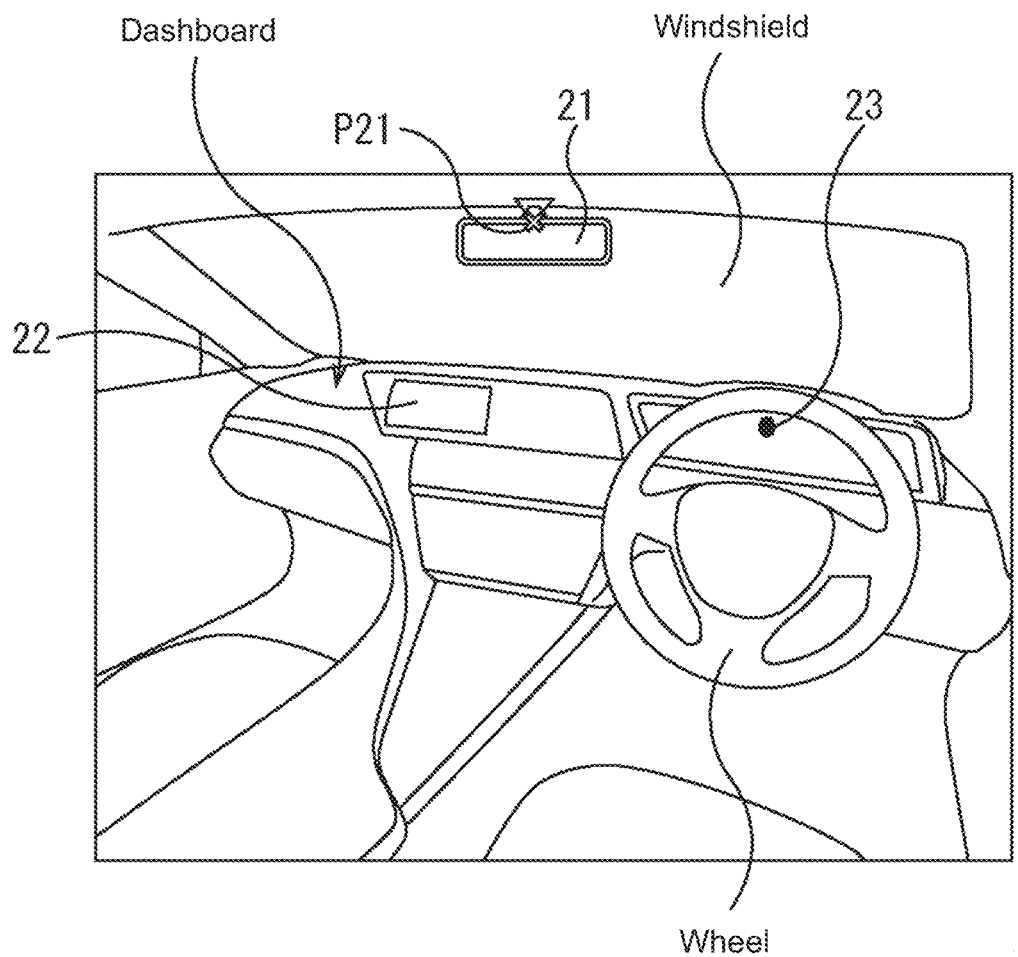
FIG. 2 is a perspective view illustrating an example of a configuration of the interior of the vehicle 10.

FIG. 2 is a perspective view illustrating an example of a configuration of the interior of the vehicle 10 of FIG. 1.

A BM display section 21 that displays thereon a BM image is provided at a position, in the vehicle 10, at which the interior rearview mirror is installed. The BM display section 21 is a display section that is an alternative to the interior rearview mirror.

An RV display section 22 that displays thereon an RV image is provided at a center position of a dashboard in the vehicle 10.

Note that an in-vehicle camera 23 used to capture an image of a driver is provided on the side of a driver's seat of the dashboard in the vehicle 10. An image of the driver is captured to be output by the in-vehicle camera 23. In the vehicle 10, positions of the line of sight and the head of the driver are detected from the image of the driver.

Here, the in-vehicle camera 23 used to capture an image of the driver may be provided at any position other than a position on the dashboard, such as a position P21 above the BM display section 21.

<First Example of Configuration of Viewing System>

Figure 3:
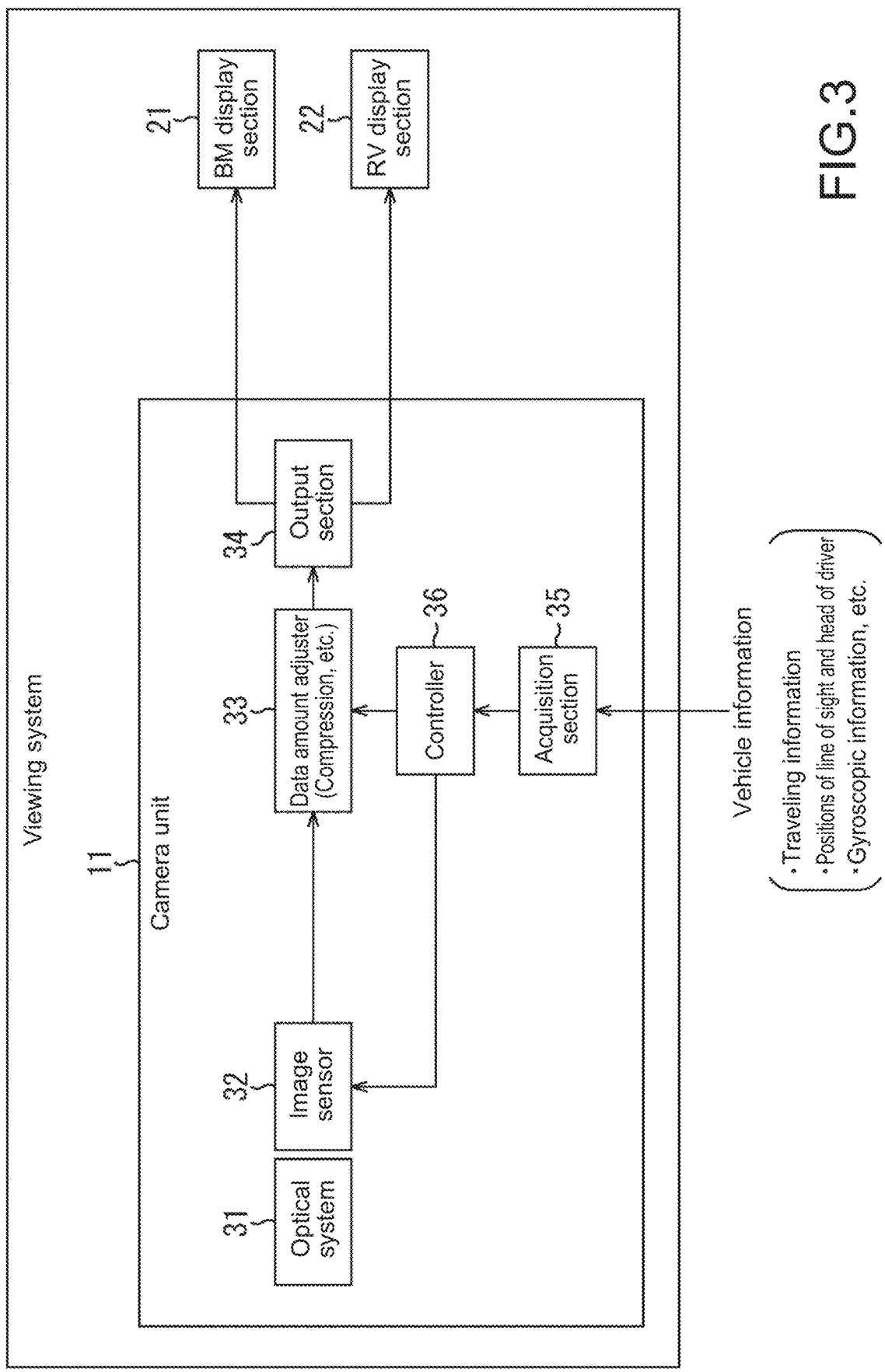
FIG. 3 is a block diagram illustrating a first example of a configuration of the viewing system included in the vehicle 10.

FIG. 3 is a block diagram illustrating a first example of a configuration of the viewing system included in the vehicle 10.

The viewing system includes the camera unit 11, the BM display section 21, and the RV display section 22 described with reference to FIGS. 1 and 2.

The camera unit 11 includes an optical system 31, an image sensor 32, a data amount adjuster 33, an output section 34, an acquisition section 35, and a controller 36.

The optical system 31 includes optical components such as a condenser and a diaphragm, and collects light entering the optical system 31 onto the image sensor 32.

The image sensor 32 receives light from the optical system 31 and performs photoelectric conversion to capture a captured image. Then, in accordance with control performed by the controller 36, the image sensor 32 extracts the BM image and the RV image from the captured image to output the read images. The BM image and the RV image that are output by the image sensor 32 is supplied to the data amount adjuster 33.

In accordance with control performed by the controller 36, the data amount adjuster 33 adjusts data amounts of the BM image and the RV image that are output by the image sensor 32, and supplies, to the output section 34, the BM image and the RV image of which the respective data amounts have been adjusted.

The output section 34 is an output interface (IF) that transmits, to the outside of the camera unit 11, the BM image and the RV image from the data amount adjuster 33. The output section 34 transmits the BM image to the BM display section 21, and transmits the RV image to the RV display section 22. The BM image from the output section 34 is displayed on the BM display section 21 in accordance with the specification of the BM display section 21, and the RV image from the output section 34 is displayed on the RV display section 22 in accordance with the specification of the RV display section 22. The output section 34 is capable of performing a format conversion and other image processing on the BM image and the RV image as necessary.

The acquisition section 35 acquires, from the vehicle 10, information that can be acquired from the vehicle 10 (hereinafter also referred to as vehicle information), and supplies the acquired vehicle information to the controller 36.

Here, examples of the vehicle information include traveling information, the specifications of the BM display section 21 and the RV display section 22, positions of the line of sight and the head of a driver of the vehicle 10, and gyroscopic information.

The traveling information is information that indicates a traveling state of the vehicle 10, and specifically indicates a vehicle speed and a traveling direction (forward or backward). For example, it is possible to acquire the vehicle speed from output of a speed sensor when the vehicle 10 includes the speed sensor. For example, it is possible to acquire the traveling direction from a state of the transmission.

For example, the specifications of the BM display section 21 and the RV display section 22 are the resolution of the BM display section 21 and the resolution of the RV display section 22, and can be acquired from the BM display section 21 and the RV display section 22.

The positions of the line of sight and the head of a driver of the vehicle 10 are obtained from an image captured by the in-vehicle camera 23.

The gyroscopic information is information that indicates a pose of the vehicle 10 (an angle of the inclination of the vehicle). It is possible to obtain the gyroscopic information from output of a gyroscope when the vehicle 10 includes the gyroscope. The use of the gyroscopic information makes it possible to recognize whether the vehicle 10 is on a hill.

The controller 36 controls the image sensor 32 and the data amount adjuster 33 according to the vehicle information supplied by the acquisition section 35.

In other words, for example, the controller 36 performs, according to the vehicle information, an extraction control for controlling extraction of a BM image and an RV image from a captured image captured by the image sensor 32. Further, according to the vehicle information, the controller 36 performs an adjustment control for controlling adjustment of data amounts of the BM image and the RV image that is performed by the data amount adjuster 33.

Thus, it can be said that the image sensor 32 extracts a BM image and an RV image from a captured image according to vehicle information, and the data amount adjuster 33 adjusts data amounts of the BM image and the RV image according to the vehicle information.

<Control of Reading of Read Image from Captured Image>

Figure 4:
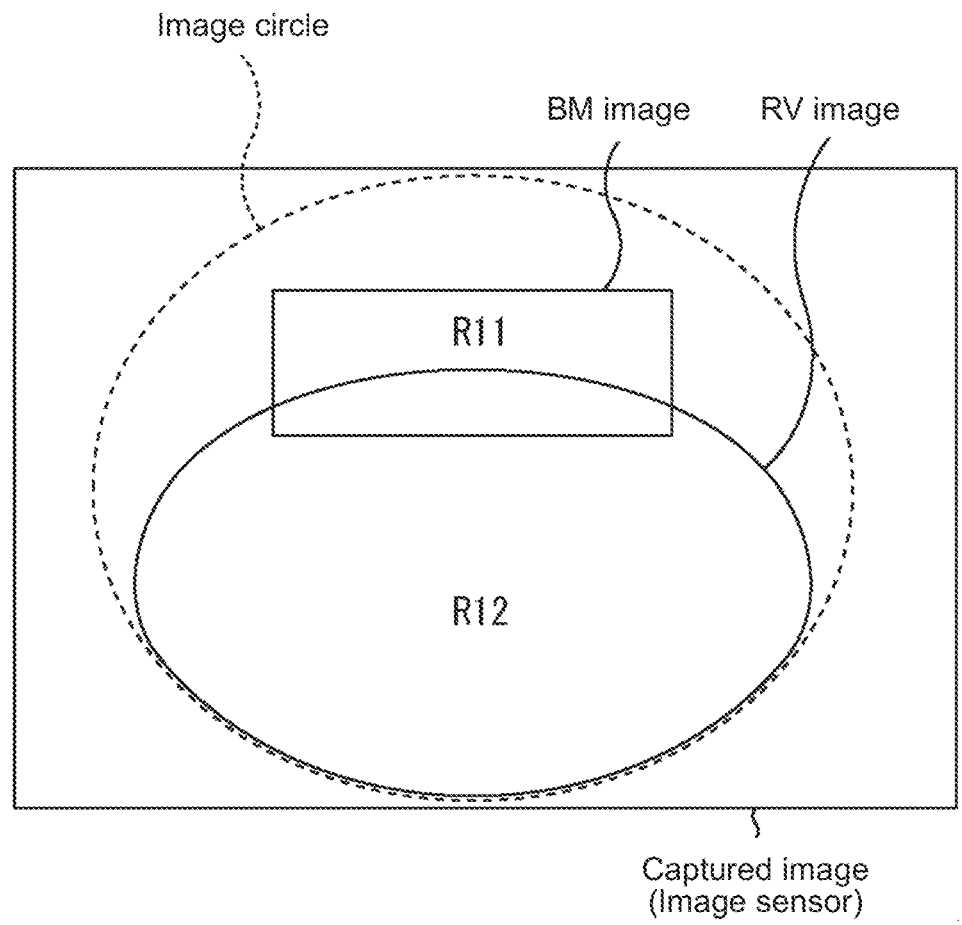
FIG. 4 is a diagram describing an example of a control of extraction of a BM image and an RV image from a captured image, the control being performed by a controller 36.

FIG. 4 is a diagram describing an example of a control of extraction of a BM image and an RV image from a captured image, the control being performed by the controller 36.

Regarding a positional relationship between the optical system 31 and a captured image captured by the image sensor 32, the captured image (a light-receiving surface of the image sensor 32) includes an image circle of (a lens included in) the optical system 31, as illustrated in, for example, FIG. 4.

In the extraction control, the controller 36 controls reading of data (a pixel signal) from the image sensor 32 such that a specified region R11 is extracted from a captured image as a BM image, the specified region R11 being a region in which a region situated further rearward than a region just behind the rear of the vehicle 10 appears (a region observed using an interior rearview mirror if the interior rearview mirror is installed in the vehicle 10).

Further, in the extraction control, the controller 36 controls reading of data from the image sensor 32 such that a specified region R12 is extracted as an RV image from (an image in the image circle from among) the captured image, the specified region R12 being a region in which the rear of the vehicle 10 and the region just behind the rear of the vehicle 10 appear.

In accordance with control performed by the controller 36, the image sensor 32 reads, from a captured image obtained by performing image-capturing, data (a pixel signal) of the region R11 that corresponds to (data of) the BM image, and reads, from the captured image, data of the region R12 that corresponds to the RV image.

Note that the sizes of the regions R11 and R12 can be set according to the specifications of the BM display section 21 and the RV display section 22.

Further, in the control of extraction of a BM image, the controller 36 controls (a position of) the region R11 extracted as the BM image, according to one of positions of the line of sight and the head of a driver, or according to both of them.

In other words, if an interior rearview mirror is installed in the vehicle 10, a range that appears in an image that can be seen by a driver using the interior rearview mirror will be changed as the driver moves his/her line of sight or his/her head. In the control of extraction of a BM image, the controller 36 changes a position of the region R11 extracted as the BM image, according to the positions of the line of sight and the head of the driver, such that the driver can see a BM image of a range similar to the range in an image that can be observed when the interior rearview mirror is installed in the vehicle 10.

Moreover, in the control of extraction of a BM image, the controller 36 can control the region R11 extracted as the BM image, according to gyroscopic information included in vehicle information.

Figure 5:
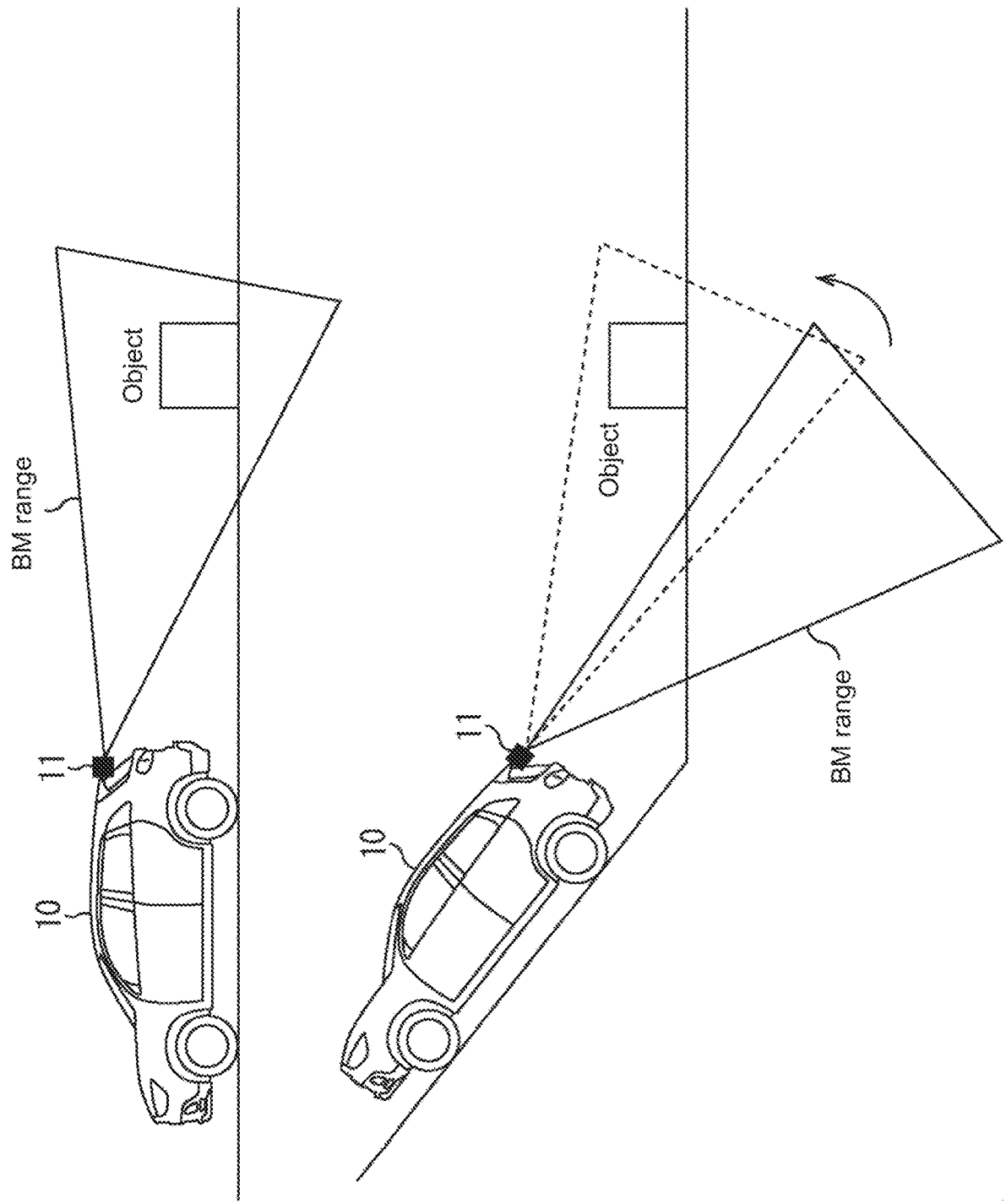
FIG. 5 is a diagram describing the control of extraction of (a region R11 that is) a BM image, the control being performed according to gyroscopic information.

FIG. 5 is a diagram describing the control of extraction of (the region R11 that is) a BM image, the control being performed according to gyroscopic information.

Here, the range of a three-dimensional space in a BM image is referred to as a BM range. Further, it is assumed that positions of the line of sight and the head of a driver are fixed in order to simplify the description. Therefore, it is assumed that (a position of) the region R11 extracted as a BM image from a captured image, and thus a BM range are not changed due to the driver moving the position of his/her line of sight or his/her head.

Further, it is assumed that, when the vehicle 10 is on a flat road, an object situated rearward a specified distance from the vehicle 10 appears in a BM image.

In this case, when the vehicle 10 is on an uphill, there is no change in BM range, but the optical axis of the camera unit 11 installed in the rear of the vehicle 10 is downwardly inclined (toward the road), compared to when the vehicle 10 is on a flat road.

Consequently, an object situated rearward a specified distance from the vehicle 10 that is within a BM image and appears in a BM image when the vehicle 10 is on a flat road, is not within the BM range and does not appears in the BM image when the vehicle 10 is on an uphill. In other words, an object situated rearward a specified distance from the vehicle 10 appears in a BM image when the vehicle 10 is on a flat road, and does not appear in the BM image when the vehicle 10 is on an uphill.

In this case, when the vehicle 10 is on an uphill, a rearward range, on a road, that can be confirmed by a driver of the vehicle 10 using a BM image is smaller, compared to when the vehicle 10 is on a flat road.

Thus, in the control of extraction of a BM image, the controller 36 can control the region R11 extracted as the BM image, according to gyroscopic information included in vehicle information.

In other words, according to gyroscopic information, the controller 36 can change the position of the region R11 extracted as a BM image to an upper position in a captured image when the front side of the vehicle 10 is upwardly inclined.

Accordingly, an object situated rearward a specified distance from the vehicle 10 appears in a BM image when the vehicle 10 is on a flat road. Further, it is possible to prevent the object from not appearing in the BM image when the vehicle 10 is on an uphill. Note that, according to gyroscopic information, the controller 36 can change the position of the region R11 extracted as a BM image to a lower position in a captured image when the vehicle 10 is on a downhill.

<Example of Configuration of Image Sensor 32>

Figure 6:
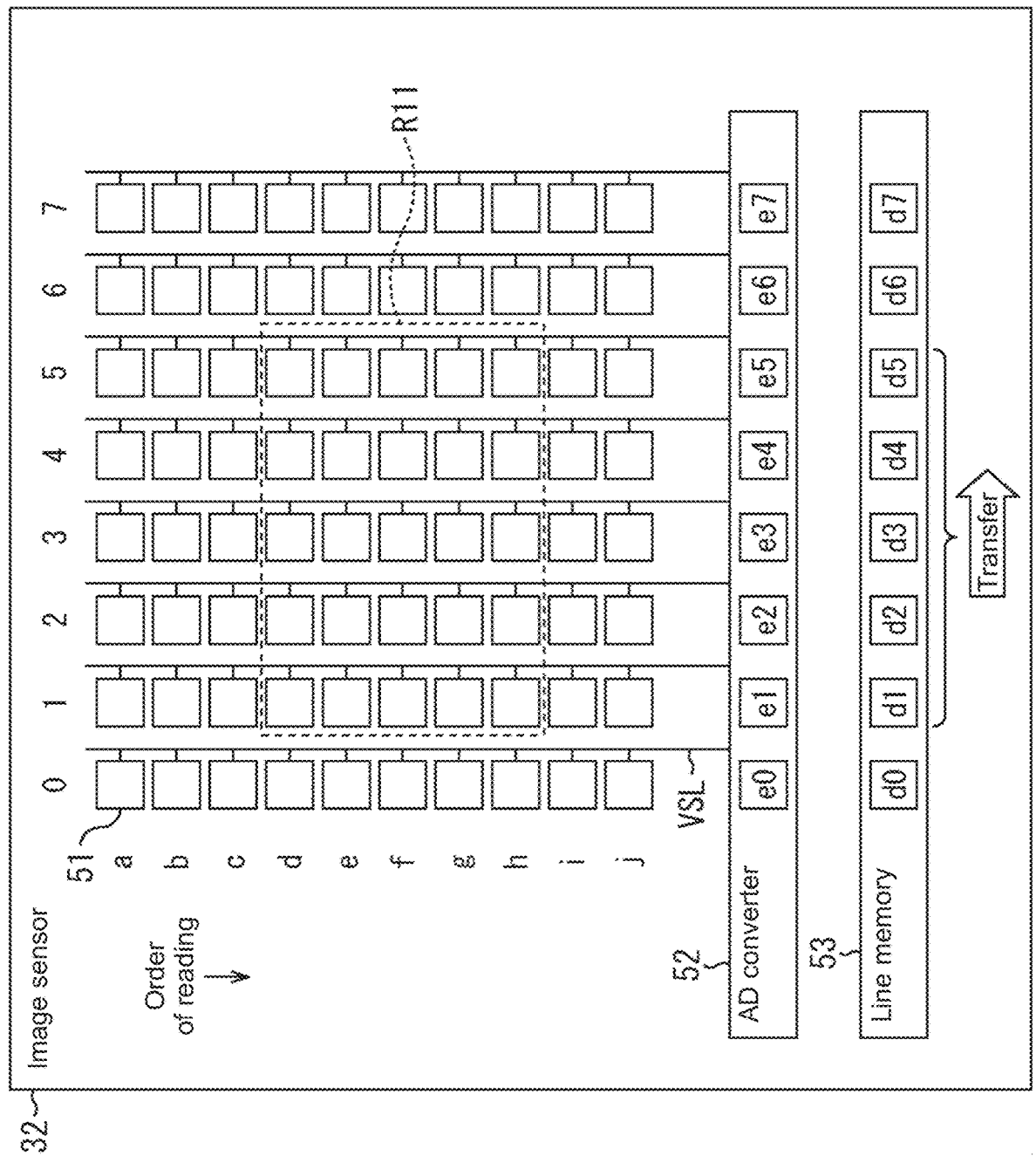
FIG. 6 illustrates an example of a configuration of an image sensor 32.

FIG. 6 illustrates an example of a configuration of the image sensor 32 of FIG. 3.

The image sensor 32 includes a plurality of pixels 51, an analog-to-digital (AD) converter, and a line memory 53.

The plurality of pixels 51 is arranged in a two-dimensional plane. In FIG. 6, the plurality of pixels 51 is arranged in a grid. A vertical signal line (VSL) is routed with respect to each column of the pixels 51 arranged in a grid, and the pixels 51 in each column are connected to a VSL routed with respect to the column. The pixel 51 converts light entering the pixel 51 into a pixel signal that is an electrical signal corresponding to an amount of the light. The pixel signal is read from the pixel 51 to be output to a VSL routed with respect to a column of that pixel 51.

For example, an AD converter 52 includes, for each column of the pixels 51 arranged in a grid, an AD converter (ADC) (not illustrated) that is responsible for AD conversion performed on a pixel signal of the pixel 51 in the column. The ADC for each column is connected to a VSL routed with respect to the column, and performs AD conversion on a pixel signal read from the pixel 51 connected to the VSL. The pixel signal on which AD conversion has been performed by the ADC of the AD converter 52 for each column is supplied to the line memory 53.

The line memory 53 stores therein pixel signals of at most the pixels 51 included in one row and supplied by the AD converter 52, and sequentially transfers the stored pixel signals in a row direction to output the pixel signals to the outside of the image sensor 32.

Here, in FIG. 6, the pixel 51 in the yth row from the top and in the xth column from the left, and a pixel signal obtained from the pixel 51 are also hereinafter respectively represented by a pixel yx and a pixel signal yx as appropriate.

A captured image is an image that is made up of pixel signals obtained from all of the pixels (the effective pixels) 51 of the light-receiving surface of the image sensor 32. In the image sensor 32, a pixel signal is read for each row in a direction of a lower row from the pixel 51 in an uppermost row a when the captured image is output.

The pixel signals of the pixels 51 in one row are supplied to the AD converter 52 through a VSL. In the AD converter 52, AD conversion is performed on the pixel signals of the pixels 51 in one row at the same time, and the pixel signal on which AD conversion has been performed is supplied to be stored in the line memory 53.

In the line memory 53, pixel signals of the pixels 51 in one row that are supplied by the AD converter 52 are stored and sequentially transferred in a row direction to be read into the outside of the image sensor 32.

The processing described above is performed with respect to all of the rows of the pixels 51, and this results in (pixel signals for) a captured image for a single screen being read into the outside of the image sensor 32.

A BM image and an RV image correspond to (images of) regions that are portions of a captured image. Thus, in order to obtain the BM image and the RV image, there is no need to read the entire captured image from the image sensor 32, and it is sufficient if only (pixel signals for) regions that are portions of the captured image that respectively correspond to the BM image and the RV image, are read.

Here, reading of an entire captured image from the image sensor 32 is also referred to as full reading, and reading of a region that is a portion of the captured image from the image sensor 32 is also referred to as partial reading.

In the extraction control for controlling reading of data from the image sensor 32 such that a BM image and an RV image are extracted from a captured image, the image sensor 32 is controlled by the controller 36 such that partial reading is performed.

For example, when the region R11 corresponding to a BM image is made up of the pixels 51 in columns 1 to 5 from among the pixels 51 in rows d to h, as illustrated in FIG. 6, the controller 36 controls the image sensor 32 such that pixel signals of the pixels 51 in columns 1 to 5 from among the pixels 51 in rows d to h are read.

In this case, in the image sensor 32, the pixel signals of the pixels 51 in the row d are read, AD conversion is performed by the AD converter 52 with respect to the read pixel signals, and the pixel signals on which AD conversion has been performed are supplied to the line memory 53. Then, the line memory 53 stores therein the pixel signals of the pixels 51 in the row d, the pixel signals being pixel signals on which AD conversion has been performed. Then, in the line memory 53, pixel signals d1, d2, d3, d4, and d5 of the pixels 51 in the rows 1 to 5 from among the pixels 51 in the row d, are sequentially transferred to be read into the outside of the image sensor 32.

AD conversion is performed by the AD converter 52 with respect to pixel signals of the pixels 51 in a next row e while the pixel signals d1 to d5 of the pixels 51 in the rows 1 to 5 from among the pixels 51 in the row d are being transferred in the line memory 53. Subsequently, pixel signals of the pixels 51 in the columns 1 to 5 from among the pixels 51 in the rows d to h are similarly read into the outside of the image sensor 32.

As described above, in the image sensor 32, the partial reading makes it possible to extract a BM image and an RV image from a captured image.

Note that, in FIG. 6, a column-parallel-based AD conversion approach in which a single ADC is responsible for AD conversion performed on a pixel signal of the pixel 51 in a single column, is adopted as an approach for AD conversion performed by the AD converter 52. However, the approach for AD conversion performed by the AD converter 52 is not limited to the column-parallel-based AD conversion approach. For example, an area-based AD conversion approach in which a single ADC is responsible for AD conversion performed on a pixel signal of the pixel 51 in an area that includes a signal pixel or a plurality of pixels, may be adopted as the approach for AD conversion performed by the AD converter 52.

<Image that can be Output by Image Sensor 32>

FIG. 7 illustrates an example of an image that can be output by the image sensor 32.

Here, a highest-resolution captured image that can be output by the image sensor 32 is referred to as a highest-resolution image. It is assumed that, for example, the image sensor 32 has the ability to output a highest-resolution image of a resolution (the number of pixels) Rmax at (a frame rate of) 60 fps (frame per second) or more.

Here, it is assumed that a resolution RBM for a highest-resolution BM image (a BM image of a largest number of pixels) that is extracted from the highest-resolution image is equal to or less than ½ of the resolution Rmax for the highest-resolution image. It is also assumed that a resolution RRV for a highest-resolution RV image that is extracted from the highest-resolution image is equal to or less than the resolution RBM for the BM image.

In the present embodiment, it is assumed that, for example, a sum RBM+RRV of the resolution RBM for a BM image and the resolution RRV for a RV image is equal to or less than ½ of the resolution Rmax for the highest-resolution image. In this case, the use of the image sensor 32 capable of outputting a highest-resolution image of the resolution Rmax at 60 fps (or more) makes it possible to output both the BM image of the resolution RBM and the RV image of the resolution RRV at 120 fps, the BM image and the RV image being obtained by partially reading the high-resolution image.

<Example of Vehicle Transmission Bandwidth that can be Used for Data Transmission in Vehicle 10>

FIG. 8 is a diagram describing an example of a vehicle transmission bandwidth that can be used for data transmission in the vehicle 10.

In other words, FIG. 8 illustrates examples of a BM image and an RV image that can be output by the camera unit 11 without data amounts being adjusted by the data amount adjuster 33.

For example, the camera unit 11 can output, as a BM image, a color image of the resolution RBM in a YUV 4:2:2 format in which the number of bits per pixel is eight (with respect to each of the brightness and a difference in color). Further, for example, the camera unit 11 can output, as an RV image, a color image of the resolution RRV in the YUV 4:2:2 format in which the number of bits per pixel is eight.

The BM image of the resolution RBM in the YUV 4:2:2 format in which the number of bits per pixel is eight is referred to as a highest-quality BM image, and the RV image of the resolution RRV in the YUV 4:2:2 format in which the number of bits per pixel is eight is referred to as a highest-quality RV image.

In the present embodiment, it is assumed that the vehicle transmission bandwidth, which is a bandwidth in which data is transmitted from the camera unit 11, is a transmission bandwidth in which, for example, two screens of a highest-quality BM image at 60 fps can be transmitted (in real time). In the present embodiment, the vehicle transmission bandwidth in which two screens of a highest-quality BM image at 60 fps can be transmitted, makes it possible to transmit, for example, two screens of a highest-quality RV image at 60 fps, since RBM RRV. Further, the vehicle transmission bandwidth makes it possible to transmit, for example, two screens in total that are a single screen of the highest-quality BM image at 60 fps, and a single screen of the highest-quality RV image at 60 fps.

As described with reference to FIGS. 7 and 8, the camera unit 11 is capable of outputting both a highest-quality BM image and a highest-quality RV image at up to 120 fps.

However, in the present embodiment, the vehicle transmission bandwidth only makes it possible to transmit two screens of a highest-quality BM image (or RV image) at 60 fps.

The increase in vehicle transmission bandwidth makes it possible to transmit both a highest-quality BM image and a highest-quality RV image at 120 fps that can be output by the camera unit 11. However, the increase in vehicle transmission bandwidth results in increasing the costs for the viewing system.

In the present technology, the camera unit 11 appropriately adjusts data amounts of a BM image and an RV image to transmit the BM image and the RV image in the vehicle transmission bandwidth, in order to suppress an increase in the costs for the viewing system.

<Control of Adjustment of Data Amounts of BM Image and RV Image when Two Screens of Highest-Quality BM Image at 60 Fps can be Transmitted in Vehicle Transmission Bandwidth>

Figure 9:
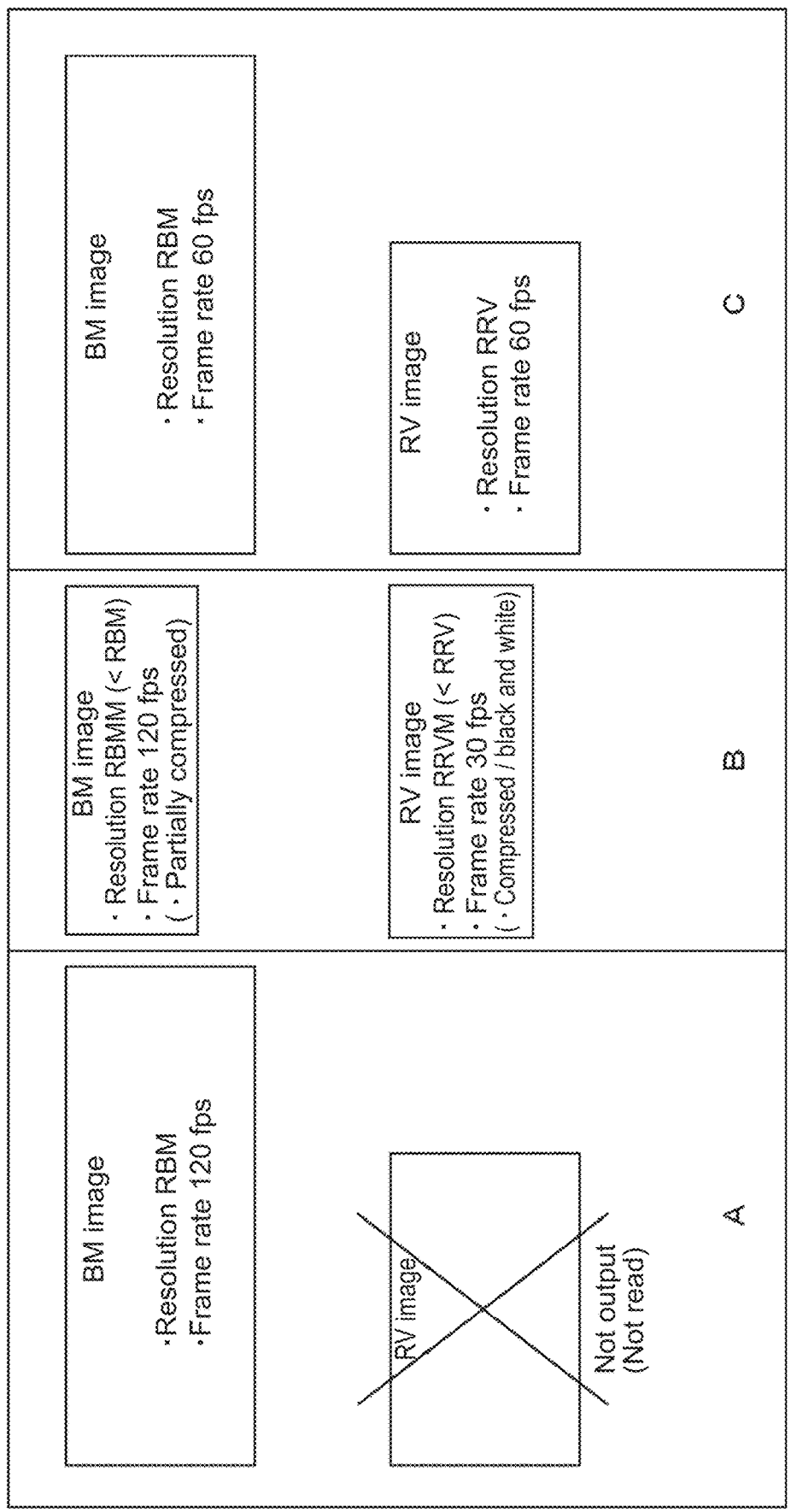
FIG. 9 is a diagram describing a first example of a control of adjustment of data amounts of a BM image and an RV image, the control being performed by a controller 36.

FIG. 9 is a diagram describing a first example of a control of adjustment of data amounts of a BM image and an RV image, the control being performed by the controller 36.

A of FIG. 9 illustrates the adjustment control performed when the vehicle 10 is traveling forward, and is traveling backward at a high speed that is a speed equal to or greater than a first threshold for speed.

In this case, the controller 36 performs an adjustment control that is a control of the data amount adjuster 33, such that a BM image of the resolution RBM at 120 fps is output and output of an RV image is restricted. In accordance with the adjustment control performed by the controller 36, the data amount adjuster 33 adjusts data amounts of a BM image and an RV image from the image sensor 32 to output the BM image of the resolution RBM at 120 fps and to restrict output of the RV image.

Thus, in this case, the BM image of the resolution RBM at 120 fps is output from the camera unit 11, and the RV image is not output from the camera unit 11. Consequently, the BM image of the resolution RBM at 120 fps is displayed on the BM display section 21, and the RV image is not displayed on the RV display section 22.

As described above, when the vehicle 10 is traveling forward, and is traveling backward at the high speed, a driver can confirm a region situated further rearward than a region just behind the rear of the vehicle 10, using a BM image of the resolution RBM at 120 fps, that is, a high-resolution BM image at a high frame rate.

Note that, when the vehicle 10 is traveling forward, and is traveling backward at the high speed, an RV image that includes an image of the region just behind the rear of the vehicle 10 is not displayed.

Further, a BM image of the resolution RBM at 120 fps that is output by the camera unit 11 can be transmitted in the vehicle transmission bandwidth in which two screens of a highest-quality BM image (of the resolution RBM) at 60 fps can be transmitted.

Here, examples of a data amount adjusting method for adjusting a data amount of an image that is performed by the data amount adjuster 33 include a method for reducing resolution (the number of pixels), a method for reducing gradation (the number of bits per pixel), a method for reducing a frame rate, and a compression method using a specified compression-encoding approach, in addition to the method for restricting output of an image (not outputting an image) as described above.

In addition to being performed by the data amount adjuster 33, a restriction of output of an image, a reduction in resolution, a reduction in gradation, and a reduction in frame rate from among the data amount adjusting methods can be performed by the image sensor 32 by the controller 36 performing control such as a control of extraction performed by the image sensor 32.

In other words, the restriction of output of an image such as a restriction of output of an RV image can be performed by the controller 36 controlling reading of data from the image sensor 32 and not reading a pixel signal corresponding to the RV image from the pixel 51 (FIG. 6), such that extraction of an RV image from a captured image is restricted. When the vehicle 10 is traveling forward, and is traveling backward at the high speed, the controller 36 can control, according to vehicle information, extraction performed by the image sensor 32 such that extraction of an RV image from a captured image is restricted. Of course, output of an RV image may be restricted by the data amount adjuster 33, not by the image sensor 32.

The resolution of an image can be reduced by, for example, the controller 36 controlling the image sensor 32 such that the number of pixels 51 from which a pixel signal is read is reduced, or such that binning for adding pixel signals of a plurality of pixels 51 is performed by performing, for example, a so-called source follower (SF) addition or floating diffusion (FD) addition.

The gradation can be reduced by, for example, the controller 36 controlling the image sensor 32 such that the number of bits necessary for AD conversion performed by the AD converter 52 (FIG. 6) is reduced.

The frame rate can be reduced by, for example, the controller 36 controlling the image sensor 32 such that a rate at which a pixel signal is read from the pixel 51, or a rate at which AD conversion is performed by the AD converter 52 is reduced.

B of FIG. 9 illustrates the adjustment control performed when the vehicle 10 is traveling backward at a medium speed that is a speed that is less than the first threshold and is equal to or greater than a second threshold less than the first threshold.

In this case, the controller 36 performs an adjustment control that is a control of the data amount adjuster 133 such that a BM image of a resolution RBMM at 120 fps is output and an RV image of a resolution RRVM at 30 fps is output, the resolution RBMM being less than the resolution RBM, the resolution RRVM being less than the resolution RRV. In accordance with the adjustment control performed by the controller 36, the data amount adjuster 33 adjusts data amounts of a BM image and an RV image from the image sensor 32 to output the BM image of the resolution RBMM at 120 fps and to output the RV image of the resolution RRVM at 30 fps.

Thus, in this case, the BM image of the resolution RBMM at 120 fps and the RV image of the resolution RRVM at 30 fps are output by the camera unit 11. Consequently, the BM image of the resolution RBMM at 120 fps is displayed on the BM display section 21, and the RV image of the resolution RRVM at 30 fps is displayed on the RV display section 22.

As described above, when the vehicle 10 is traveling backward at the medium speed, a driver can confirm a region situated further rearward than a region just behind the rear of the vehicle 10, using a BM image of the resolution RBMM at 120 fps, that is, a medium-resolution BM image at the high frame rate. Further, the driver can confirm the region just behind the rear of the vehicle 10, using an RV image of the resolution RRVM at 30 fps, that is, a medium-resolution RV image at a low frame rate.

Note that it is assumed that a transmission bandwidth necessary to transmit a RV image of the resolution RRVM at 30 fps is equal to or less than a transmission bandwidth for a difference between a maximum transmission rate (here, a transmission rate necessary to transmit a BM image of the resolution RBM at 120 fps without compressing the BM image) and a transmission rate (a first transmission rate) necessary to transmit the resolution RBMM at 120 fps. In this case, both a BM image of the resolution RBMM at 120 fps and an RV image of the resolution RRVM at 30 fps that are output by the camera unit 11 can be transmitted in the vehicle transmission bandwidth in which two screens of a highest-quality BM image at 60 fps can be transmitted.

Here, when the transmission bandwidth necessary to transmit an RV image of the resolution RRVM at 30 fps is not equal to or less than the transmission bandwidth for the difference between the maximum transmission rate and the first transmission rate, one of the BM image and the RV image or both of them can be compressed (compression-encoded) by the data amount adjuster 33 such that the transmission bandwidth necessary to transmit the RV image of the resolution RRVM at 30 fps is equal to or less than the transmission bandwidth for the difference between the maximum transmission rate and the first transmission rate (such that the RV image of the resolution RRVM can be transmitted). For example, with respect to a BM image of the resolution RRVM at 120 fps, a portion of or all of the BM image is compressed (compression-encoded). This results in being able to reduce a data amount of the BM image. With respect to an RV image of the resolution RRVM at 30 fps, the RV image is compression-encoded in a state of remaining a color image, or is converted into a black-and-white image to be compression-encoded. This results in being able to reduce a data amount of the RV image.

C of FIG. 9 illustrates the adjustment control performed when the vehicle 10 is traveling backward at a low speed that is a speed that is less than the second threshold less than the first threshold.

In this case, the controller 36 performs an adjustment control that is a control of the data amount adjuster 133 such that a BM image of the resolution RBM at 60 fps is output and an RV image of the resolution RRV at 60 fps is output. In accordance with the adjustment control performed by the controller 36, the data amount adjuster 33 adjusts data amounts of a BM image and an RV image from the image sensor 32 to output the BM image of the resolution RBM at 60 fps and to output the RV image of the resolution RRV at 60 fps.

Thus, in this case, the BM image of the resolution RBM at 60 fps and the RV image of the resolution RRV at 60 fps are output by the camera unit 11. Consequently, the BM image of the resolution RBM at 60 fps is displayed on the BM display section 21, and the RV image of the resolution RRV at 60 fps is displayed on the RV display section 22.

As described above, when the vehicle 10 is traveling backward at the low speed, a driver can confirm a region situated further rearward than a region just behind the rear of the vehicle 10, using a BM image of the resolution RBM at 60 fps, that is, a high-resolution BM image at a medium frame rate. Further, the driver can confirm the region just behind the rear of the vehicle 10, using an RV image of the resolution RRV at 60 fps, that is, a high-resolution RV image at the medium frame rate.

The case in which the vehicle 10 is traveling backward at the low speed is, for example, a case in which a driver is about to park the vehicle 10, and it is important to confirm a region just behind the rear of the vehicle 10 that is a blind spot as viewed from the driver. Thus, when the vehicle 10 is traveling backward at the low speed, an RV image is displayed at a higher resolution and at a higher frame rate, compared to when the vehicle 10 is traveling backward at the high speed or the medium speed. This makes it possible to easily confirm a region of a blind spot and to easily control the vehicle according to a state of the blind spot.

Note that both a BM image of the resolution RBM at 60 fps and an RV image of the resolution RRV at 60 fps that are output by the camera unit 11 can be transmitted in the vehicle transmission bandwidth in which two screens of a highest-quality BM image at 60 fps can be transmitted.

<Control of Adjustment of Data Amounts of BM Image and RV Image when Single Screen of Highest-Quality BM Image at 60 Fps can be Transmitted in Vehicle Transmission Bandwidth>

Figure 10:
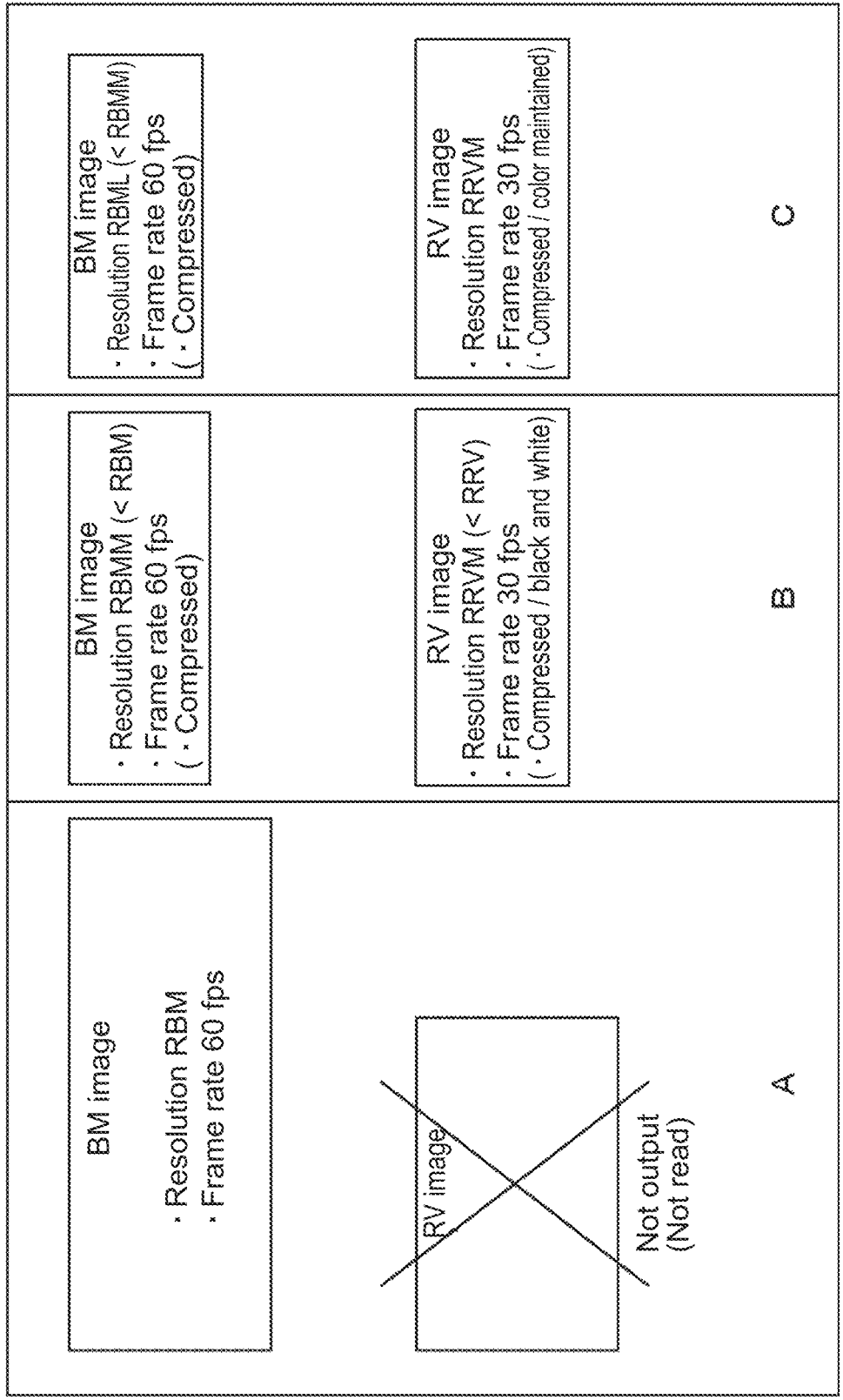
FIG. 10 is a diagram describing a second example of the control of adjustment of data amounts of a BM image and an RV image, the control being performed by the controller 36.

FIG. 10 is a diagram describing a second example of the control of adjustment of data amounts of a BM image and an RV image, the control being performed by the controller 36.

Here, in the second example of the control of adjustment of data amounts of a BM image and a RV image, it is assumed that the vehicle transmission bandwidth is a transmission bandwidth in which, for example, a single screen of a highest-quality BM image (of the resolution RBM) at 60 fps (or more) can be transmitted.

A of FIG. 10 illustrates the adjustment control performed when the vehicle 10 is traveling forward, and is traveling backward at the high speed that is a speed equal to or greater than the first threshold for speed.

In this case, the controller 36 performs an adjustment control that is a control of the data amount adjuster 33, such that a BM image of the resolution RBM at 60 fps (or more) is output and output of an RV image is restricted. In accordance with the adjustment control performed by the controller 36, the data amount adjuster 33 adjusts data amounts of a BM image and an RV image from the image sensor 32 to output the BM image of the resolution RBM at 60 fps and to restrict output of the RV image.

Thus, in this case, the BM image of the resolution RBM at 60 fps is output from the camera unit 11, and the RV image is not output from the camera unit 11. Consequently, the BM image of the resolution RBM at 60 fps is displayed on the BM display section 21, and the RV image is not displayed on the RV display section 22.

As described above, when the vehicle 10 is traveling forward, and is traveling backward at the high speed, a driver can confirm a region situated further rearward than a region just behind the rear of the vehicle 10, using a BM image of the resolution RBM at 60 fps, that is, a high-resolution BM image at the medium frame rate.

Note that, when the vehicle 10 is traveling forward, and is traveling backward at the high speed, an RV image that includes an image of the region just behind the rear of the vehicle 10 is not displayed, as described with reference to A of FIG. 9.

Further, a BM image of the resolution RBM at 60 fps that is output by the camera unit 11 can be transmitted in the vehicle transmission bandwidth in which a single screen of a highest-quality BM image (of the resolution RBM) at 60 fps can be transmitted.

B of FIG. 10 illustrates the adjustment control performed when the vehicle 10 is traveling backward at the medium speed that is a speed that is less than the first threshold and is equal to or greater than the second threshold less than the first threshold.

In this case, the controller 36 performs an adjustment control that is a control of the data amount adjuster 133 such that a BM image of the resolution RBMM at 60 fps is output and an RV image of the resolution RRVM at 30 fps is output, the resolution RBMM being less than the resolution RBM, the resolution RRVM being less than the resolution RRV. In accordance with the adjustment control performed by the controller 36, the data amount adjuster 33 adjusts data amounts of a BM image and an RV image from the image sensor 32 to output the BM image of the resolution RBMM at 60 fps and to output the RV image of the resolution RRVM at 30 fps.

Thus, in this case, the BM image of the resolution RBMM at 60 fps and the RV image of the resolution RRVM at 30 fps are output by the camera unit 11. Consequently, the BM image of the resolution RBMM at 60 fps is displayed on the BM display section 21, and the RV image of the resolution RRVM at 30 fps is displayed on the RV display section 22.

As described above, when the vehicle 10 is traveling backward at the medium speed, a driver can confirm a region situated further rearward than a region just behind the rear of the vehicle 10, using a BM image of the resolution RBMM at 60 fps, that is, a medium-resolution BM image at the medium frame rate. Further, the driver can confirm the region just behind the rear of the vehicle 10, using an RV image of the resolution RRVM at 30 fps, that is, a medium-resolution RV image at the low frame rate.

Note that, when a transmission bandwidth (hereinafter also referred to as a necessary transmission bandwidth) necessary to transmit both a BM image of the resolution RBMM at 60 fps and an RV image of the resolution RRVM at 30 fps that are output by the camera unit 11, is not within the vehicle transmission bandwidth in which a single screen of a highest-quality BM image at 60 fps can be transmitted, the BM image may be compressed at a first compression rate for medium speed, and the RV image may be compressed in a state of remaining a color image at a second compression rate for medium speed that provides a higher compression than the first compression rate for medium speed, or the RV image may be converted into a black-and-white image to be compressed at the second compression rate for medium speed, such that the necessary transmission bandwidth is within the vehicle transmission bandwidth.

C of FIG. 10 illustrates the adjustment control performed when the vehicle 10 is traveling backward at the low speed that is a speed that is less than the second threshold less than the first threshold.

In this case, the controller 36 performs an adjustment control that is a control of the data amount adjuster 133 such that a BM image of a resolution RBML at 60 fps is output and an RV image of the resolution RRVM at 30 fps is output, the resolution RBML being less than the resolution RBMM. In accordance with the adjustment control performed by the controller 36, the data amount adjuster 33 adjusts data amounts of a BM image and an RV image from the image sensor 32 to output the BM image of the resolution RBML at 60 fps and to output the RV image of the resolution RRVM at 30 fps.

Thus, in this case, the BM image of the resolution RBML at 60 fps and the RV image of the resolution RRV at 30 fps are output by the camera unit 11. Consequently, the BM image of the resolution RBML at 60 fps is displayed on the BM display section 21, and the RV image of the resolution RRVM at 30 fps is displayed on the RV display section 22.

As described above, when the vehicle 10 is traveling backward at the low speed, a driver can confirm a region situated further rearward than a region just behind the rear of the vehicle 10, using a BM image of the resolution RBML at 60 fps, that is, a low-resolution BM image at the medium frame rate. Further, the driver can confirm the region just behind the rear of the vehicle 10, using an RV image of the resolution RRVM at 30 fps, that is, a medium-resolution RV image at the low frame rate.

Note that, when the necessary transmission bandwidth necessary to transmit both a BM image of the resolution RBML at 60 fps and an RV image of the resolution RRVM at 30 fps that are output by the camera unit 11, is not within the vehicle transmission bandwidth in which a single screen of a highest-quality BM image at 60 fps can be transmitted, the BM image may be compressed at a first compression rate for low speed, and the RV image may be compressed (in a state of remaining a color image) at a second compression rate for low speed that provides a higher compression than the first compression rate for low speed, such that the necessary transmission bandwidth is within the vehicle transmission bandwidth.

Here, a rate that provides a higher compression than the first compression rate for medium speed can be adopted as the first compression rate for low speed. The same compression rate can be adopted as the second compression rate for medium speed and the second compression rate for low speed. In this case, the following is the relationship among the first and second compression rates for low speed, and the first and second compression rates for medium speed: the second compression rate for low speed=the second compression rate for medium speed>the first compression rate for low speed>the first compression rate for medium speed. However, here, it is assumed that a compression rate exhibiting a larger value provides a higher compression. The following is the relationship among data amounts respectively obtained by performing compression at the first compression rate for low speed, by performing compression at the second compression rate for low speed, by performing compression at the first compression rate for medium speed, and by performing compression at the second compression rate for medium speed: the data amount obtained by the compression at the second compression rate for low speed=the data amount obtained by the compression at the second compression rate for medium speed<the data amount obtained by the compression at the first compression rate for low speed<the data amount obtained by the compression at the first compression for medium speed.

The adjustment control for adjusting data amounts of a BM image and an RV image according to the vehicle speed and the traveling direction (forward or backward) of the vehicle 10 has been described above. The adjustment control method is not limited to the methods described with reference to FIGS. 9 and 10. In other words, the adjustment control method may be set as appropriate according to, for example, the vehicle transmission bandwidth, the ability of the image sensor 32, and the specifications of the BM display section 21 and the RV display section 22. The data amounts are respectively related to the quality of a displayed BM image and a displayed RV image. Thus, it can be said that the quality of a BM image and the quality of an RV image are changed according to the vehicle speed and the traveling direction (forward or backward) of the vehicle 10.

Further, in the adjustment control, the resolution of the BM image and the resolution of the RV image can be reduced by reducing the number of pixels included in the BM image and the RV image, or by (irreversibly) compressing the BM image and the RV image without changing the number of pixels.

When the resolution of a BM image and the resolution of a RV image are reduced by compressing the BM image and the RV image, it is possible to adopt, as compression rates at which the BM image and the RV image are compressed, compression rates such that a BM image and a RV image that are obtained by performing compression and decompression and from which a portion of frequency components such as a high frequency component has been lost, each have a substantial resolution (a highest frequency component) that is equivalent to the resolution (the number of pixels) described with reference to FIG. 9 or 10.

<Display Processing>

Figure 11:
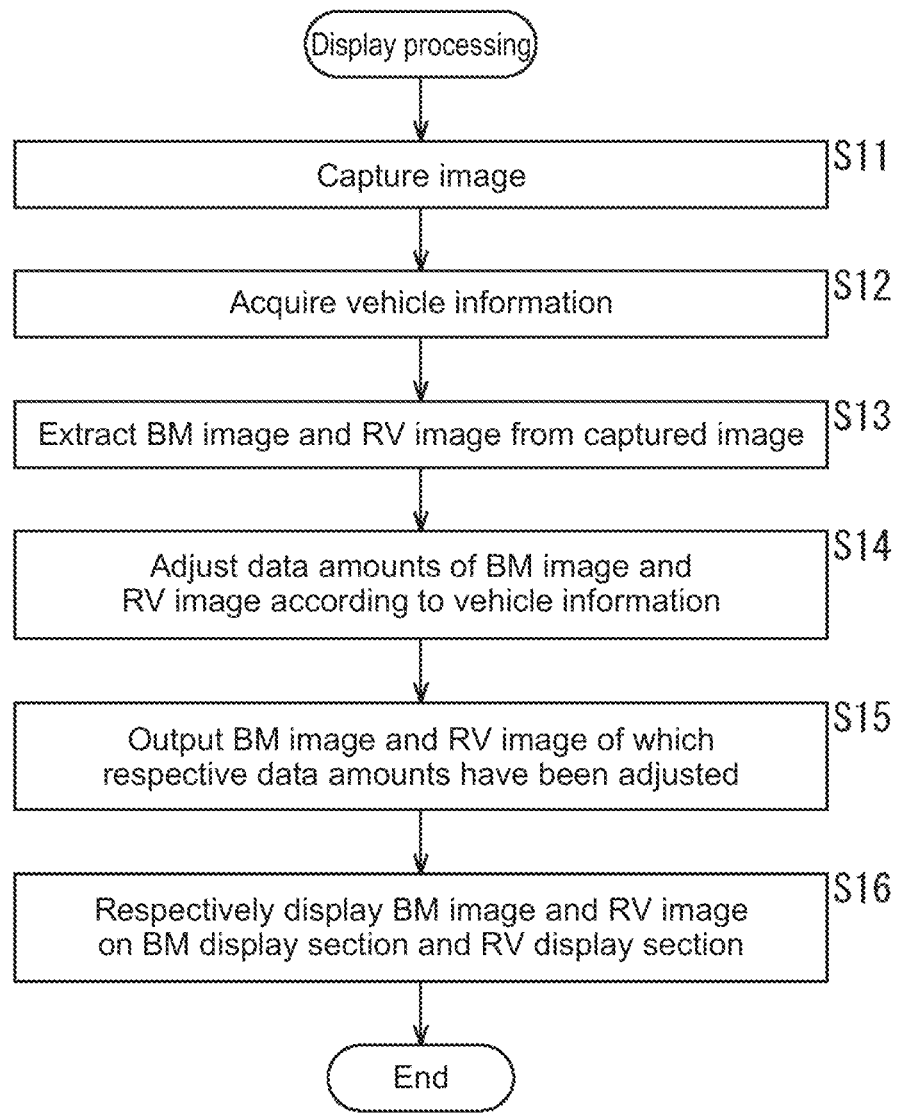
FIG. 11 is a flowchart describing an example of display processing of displaying a BM image and an RV image that is performed in the viewing system.

FIG. 11 is a flowchart describing an example of display processing of displaying a BM image and an RV image that is performed in the viewing system of FIG. 3.

In Step S11, the image sensor 32 captures a captured image, and the process moves on to Step S12.

In Step S12, the acquisition section 35 acquires vehicle information from the vehicle 10, and supplies the vehicle information to the controller 36. Then, the process moves on to Step S13.

In Step S13, the controller 36 controls extraction performed by the image sensor 32 according to the vehicle information from the acquisition section 35. The image sensor 32 extracts a BM image and an RV image from the captured image in accordance with the extraction control performed by the controller 36. Then, the image sensor 32 supplies the BM image and the RV image to the data amount adjuster 33, and the process moves on to Step S14 from Step S13.

In Step S14, the controller 36 controls adjustment performed by the data amount adjuster 33 according to the vehicle information from the acquisition section 35. The data amount adjuster 33 adjusts data amounts of the BM image and the RV image from the image sensor 32 in accordance with the adjustment control performed by the controller 36. Then, the data amount adjuster 33 supplies, to the output section 34, the BM image and the RV image of which the respective data amounts have been adjusted, and the process moves on to Step S15 from Step S14.

In Step S15, the output section 34 outputs, to the outside of the camera unit 11, the BM image and the RV image that are supplied from the data amount adjuster 33 and of which the respective data amounts have been adjusted, transmits the BM image to the BM display section 21, and transmits the RV image to the RV display section 22. Then, the process moves on to Step S16.

In Step S16, the BM display section 21 displays thereon the BM image from the output section 34 in accordance with the specification of the BM display section 21, and the RV display section 22 displays thereon the RV image from the output section 34 in accordance with the specification of the RV display section 22.

<Second Example of Configuration of Viewing System>

Figure 12:
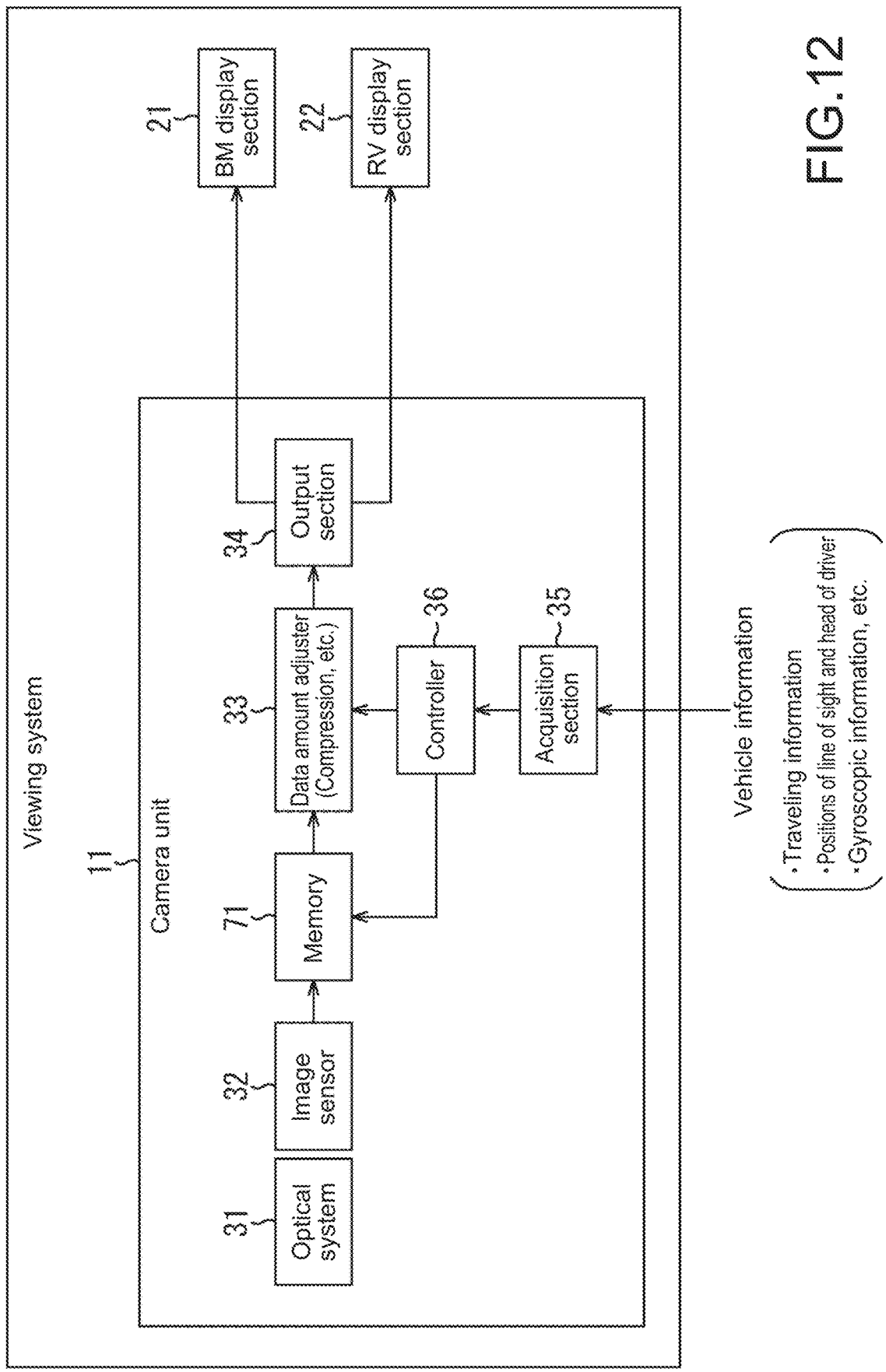
FIG. 12 is a block diagram illustrating a second example of the configuration of the viewing system included in the vehicle 10.

FIG. 12 is a block diagram illustrating a second example of the configuration of the viewing system included in the vehicle 10.

Note that, in the figure, a portion corresponding to that in FIG. 3 is denoted by the same reference numeral as FIG. 3, and a description thereof is omitted below.

In FIG. 12, the viewing system includes the camera unit 11, the BM display section 21, and the RV display section 22, and the camera unit 11 includes the optical system 31, the image sensor 32, the data amount adjuster 33, the output section 34, the acquisition section 35, the controller 36, and a memory 71.

Thus, the viewing system of FIG. 12 is similar to the viewing system of FIG. 3 in including the camera unit 11, the BM display section 21, and the RV display section 22, and in that the camera unit 11 includes the components from the optical system 31 to the controller 36.

However, the viewing system of FIG. 12 is different from the viewing system of FIG. 3 in that the camera unit 11 newly includes the memory 71.

In the viewing system of FIG. 12, the image sensor 32 supplies a highest-resolution image (a highest-resolution captured image) to the memory 71, and the memory 71 stores therein the highest-resolution image from the image sensor 32. Then, the controller 36 performs, as an extraction control, a control of reading of data (a pixel signal) from the memory 71 with respect to the memory 71, not with respect to the image sensor 32. This results in extracting a BM image and an RV image from a highest-resolution image, as in the case of FIG. 3.

The BM-image and the RV-image that are extracted from the highest-resolution image and stored in the memory 71 are supplied to the data amount adjuster 33.

Note that, with respect to the restriction of output of an RV image that is performed when the vehicle 10 is traveling forward, and is traveling backward at the high speed, as described with reference to A of FIG. 9 and A of FIG. 10, the restriction of output of an RV image may be performed in the viewing system of FIG. 12 by restricting extraction of the RV image from a highest-resolution image (by not reading the RV image) in a control of extraction from the memory 71, in addition to being performed by the data amount adjuster 33 restricting output of the RV image.

Further, display processing of displaying a BM image and an RV image in the viewing system of FIG. 12 is similar to the display processing described with reference to FIG. 11, and thus a description thereof is omitted.

However, in the viewing system of FIG. 12, the image sensor 32 captures a captured image and then the captured image is stored in the memory 71 in Step S11. Further, in Step S13, the controller 36 controls extraction from the memory 71, not from the image sensor 32, according to vehicle information from the acquisition section 35. This results in extracting a BM image and an RV image from the captured image stored in the memory 71.

<Third Example of Configuration of Viewing System>

Figure 13:
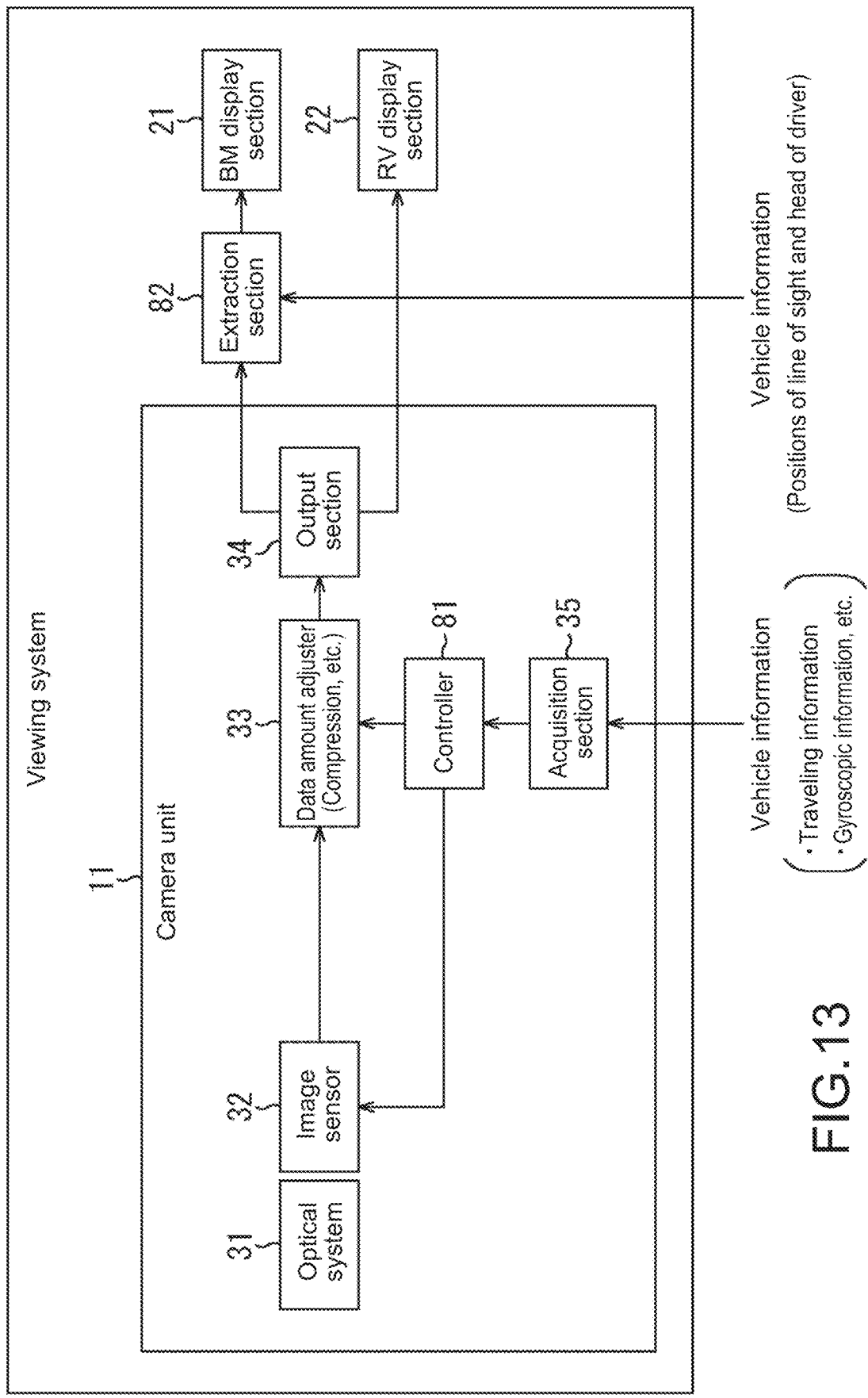
FIG. 13 is a block diagram illustrating a third example of the configuration of the viewing system included in the vehicle 10.

FIG. 13 is a block diagram illustrating a third example of the configuration of the viewing system included in the vehicle 10.

Note that, in the figure, a portion corresponding to that in FIG. 3 is denoted by the same reference numeral as FIG. 3, and a description thereof is omitted below.

In FIG. 13, the viewing system includes the camera unit 11, the BM display section 21, the RV display section 22, and an extraction section 82, and the camera unit 11 includes the optical system 31, the image sensor 32, the data amount adjuster 33, the output section 34, the acquisition section 35, and a controller 81.

Thus, the viewing system of FIG. 13 is similar to the viewing system of FIG. 3 in including the camera unit 11, the BM display section 21, and the RV display section 22, and in that the camera unit 11 includes the components from the optical system 31 to the acquisition section 35.

However, the viewing system of FIG. 13 is different from the viewing system of FIG. 3 in newly including the extraction section 82, and in that the camera unit 11 includes the controller 81 instead of the controller 36.

Note that the extraction section 82 may be provided within the camera unit 11, although the extraction section 82 is provided outside of the camera unit 11 in FIG. 13.

Vehicle information is supplied by the acquisition section 35 to the controller 81. Examples of the vehicle information include traveling information, the specifications of the BM display section 21 and the RV display section 22, and gyroscopic information. However, in this example, the vehicle information supplied by the acquisition section 35 does not include positions of the line of sight and the head of a driver. Note that the positions of the line of sight and the head of the driver of the vehicle 10 are input to the extraction section 82 as a portion of the vehicle information.

As in the case of the controller 36, the controller 81 controls extraction performed by the image sensor 32 and adjustment performed by the data amount adjuster 33, according to the vehicle information supplied by the acquisition section 35.

However, in the extraction control, the controller 81 causes a region larger in size than the region R11 to be extracted as a BM image instead of controlling (the position of) the region R11 extracted as the BM image, according to one of the positions of the line of sight and the head of the driver, or according to both of them.

Thus, the BM image output by the output section 34 in FIG. 13 is larger in size than the BM image output by the output section 34 in FIGS. 3 and 12.

In FIG. 13, the BM image larger in size than the region R11 output by the output section 34 is supplied to the extraction section 82.

The positions of the line of sight and the head of the driver from among the vehicle information are supplied to the extraction section 82, in addition to the BM image larger in size than the region R11 being supplied by the output section 34 to the extraction section 82.

According to one of the positions of the line of sight and the head of the driver, or according to both of them, the extraction section 82 extracts, as a final BM image to be displayed on the BM display section 21, a region that is a portion of the BM image larger in size than the region R11 from the output section 34, that is, a region having the same size as the region R11, and the extraction section 82 supplies the BM image to the BM display section 21.

<Control of Extraction of BM Image and RV Image from Captured Image>

Figure 14:
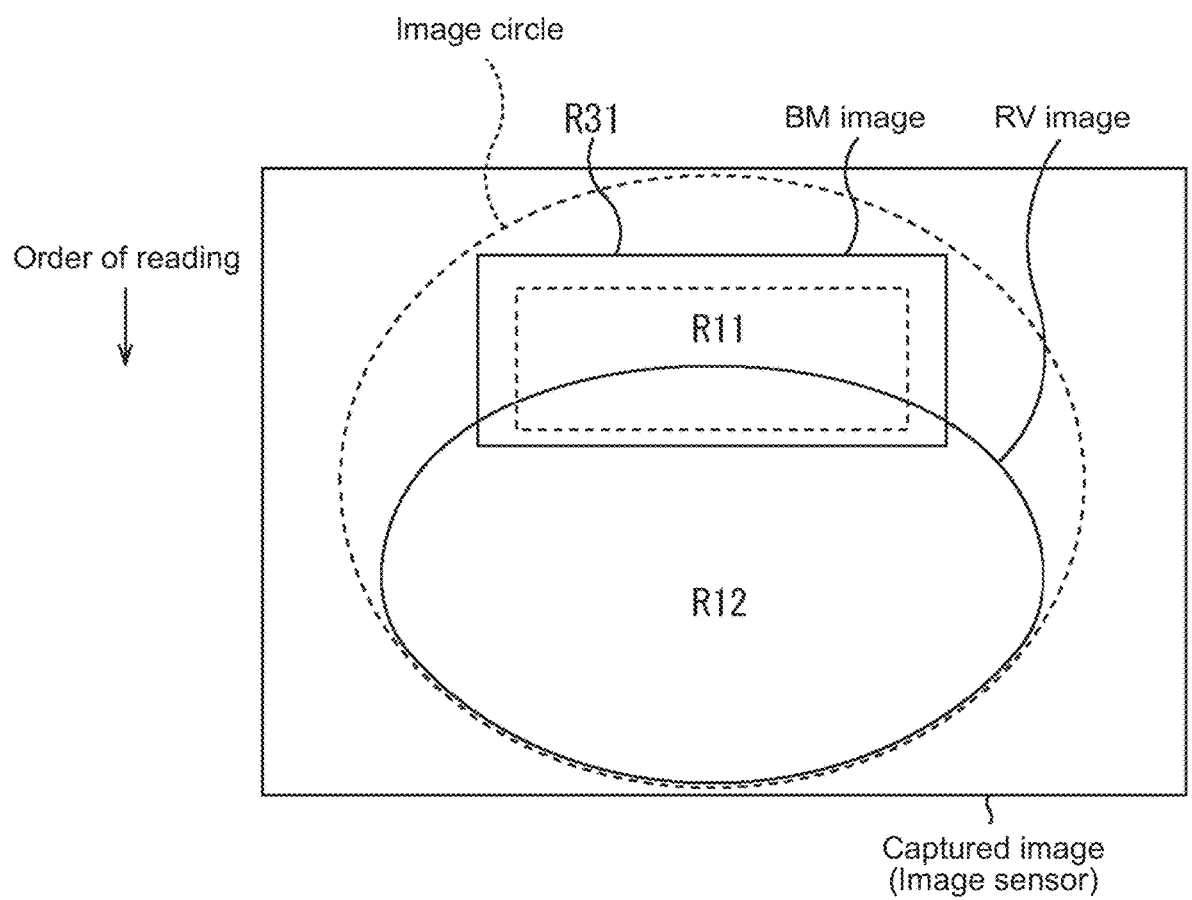
FIG. 14 is a diagram describing an example of a control of extraction of a BM image and an RV image from a captured image, the control being performed by a controller 81.

FIG. 14 is a diagram describing an example of a control of extraction of a BM image and an RV image from a captured image, the control being performed by the controller 81.

As in the case of FIG. 4, FIG. 14 illustrates an image circle of the optical system 31 and a captured image captured by the image sensor 32 (the light-receiving surface of the image sensor 32).

In the extraction control, the controller 81 controls reading of data from the image sensor 32 such that the region R12 is extracted as an RV image, as in the case of the controller 36.

Further, in the extraction control, the controller 81 controls reading of data from the image sensor 32 such that not the region R11 but a region R31 that is larger in size than the region R11 is extracted from the captured image as a BM image.

The region R31 is a region that includes a largest range that a driver can see using an interior rearview mirror by moving his/her line of sight or his/her head, if the interior rearview mirror is installed in the vehicle 10. The region R11 is a variable region of which the position is changed according to positions of the line of sight and the head of the driver, whereas the region R31 is a fixed region.

A region that is situated at a position depending on one of the positions of the line of sight and the head of the driver or depending on both of them, and has the same size as the region R11, is extracted by the extraction section 82 from the region R31 described above as a final BM image to be displayed on the BM display section 21. In other words, the region R11 to be observed by the driver using an interior rearview mirror if the interior rearview mirror is installed in the vehicle 10, is extracted by the extraction section 82 from the region R31 as a BM image.

<Display Processing>

Figure 15:
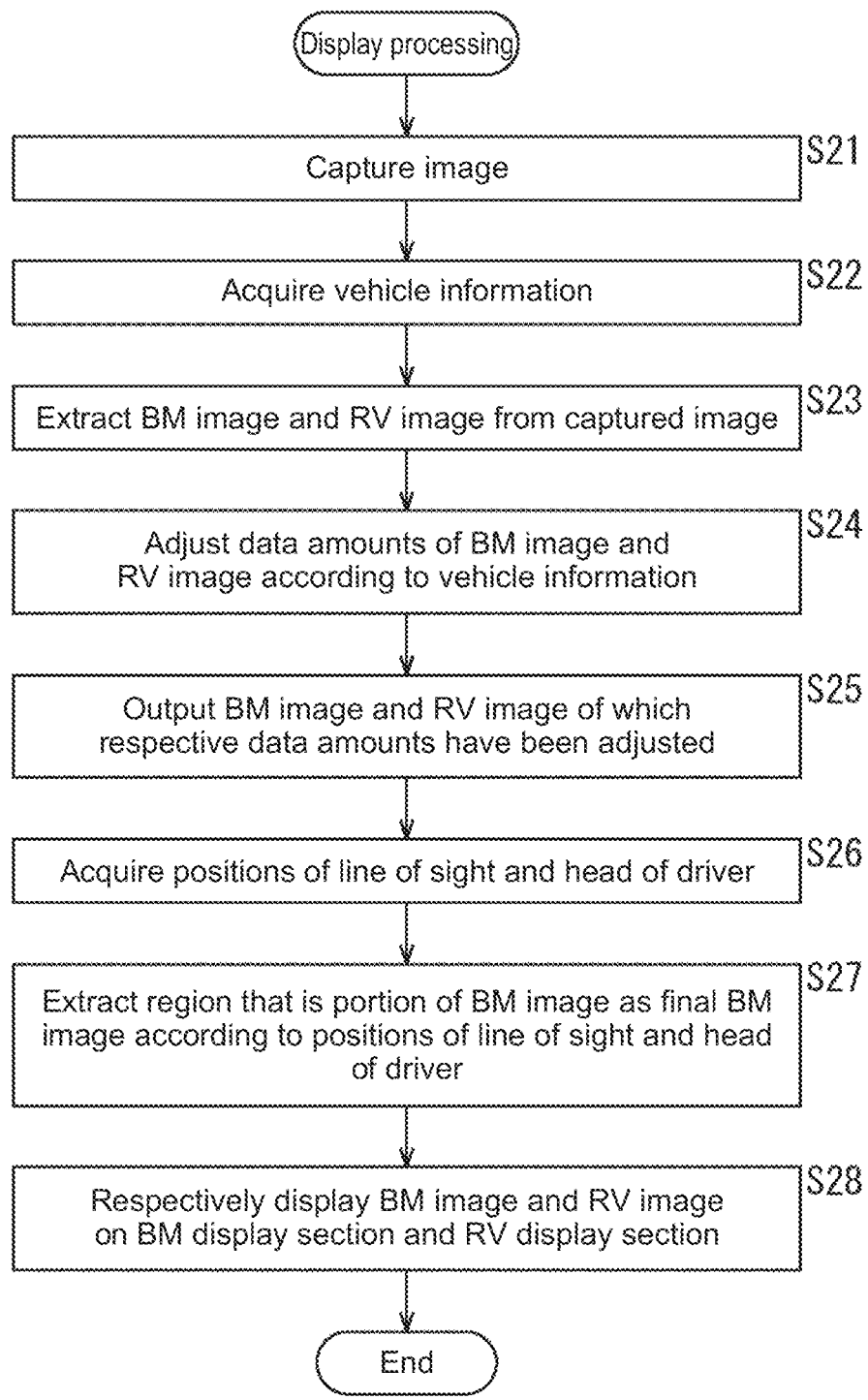
FIG. 15 is a flowchart describing an example of display processing of displaying a BM image and a RV image that is performed in the viewing system.

FIG. 15 is a flowchart describing an example of display processing of displaying a BM image and an RV image that is performed in the viewing system of FIG. 13.

In Step S21, the image sensor 32 captures a captured image, and the process moves on to Step S22.

In Step S22, the acquisition section 35 acquires vehicle information from the vehicle 10, and supplies the vehicle information to the controller 36. Then, the process moves on to Step S23.

In Step S23, the controller 36 controls extraction performed by the image sensor 32. As described with reference to FIG. 14, in accordance with the extraction control performed by the controller 36, the image sensor 32 extracts, from the captured image, the regions R31 and R12 as a BM image and an RV image, respectively. Then, the image sensor 32 supplies the BM image and the RV image to the data amount adjuster 33, and the process moves on to Step S24 from Step S23.

In Step S24, the controller 36 controls adjustment performed by the data amount adjuster 33 according to the vehicle information from the acquisition section 35. The data amount adjuster 33 adjusts data amounts of the BM image and the RV image from the image sensor 32 in accordance with the adjustment control performed by the controller 36. Then, the data amount adjuster 33 supplies, to the output section 34, the BM image and the RV image of which the respective data amounts have been adjusted, and the process moves on to Step S25 from Step S24.

In Step S25, the output section 34 outputs, to the outside of the camera unit 11, the BM image and the RV image that are supplied from the data amount adjuster 33 and of which the respective data amounts have been adjusted, and the process moves on to Step S26. Consequently, in FIG. 13, the BM image is supplied to the extraction section 82, and the RV image is transmitted to the RV display section 22.

In Step S26, the extraction section 82 acquires, from the vehicle 10, positions of the line of sight and the head of a driver that are included in the vehicle information, and the process moves on to Step S27.

In Step S27, the extraction section 82 extracts, from the BM image from the output section 34, a region that is situated at a position depending on the positions of the line of sight and the head of the driver and has the same size as the region R11, the region being extracted as a final BM image to be displayed on the BM display section 21. Then, the extraction section 82 transmits the final BM image to the BM display section 21, and the process moves on to Step S28 from Step S27.

In Step S28, the BM display section 21 displays thereon the BM image from the extraction section 82 in accordance with the specification of the BM display section 21, and the RV display section 22 displays thereon the RV image from the output section 34 in accordance with the specification of the RV display section 22.

<Fourth Example of Configuration of Viewing System>

Figure 16:
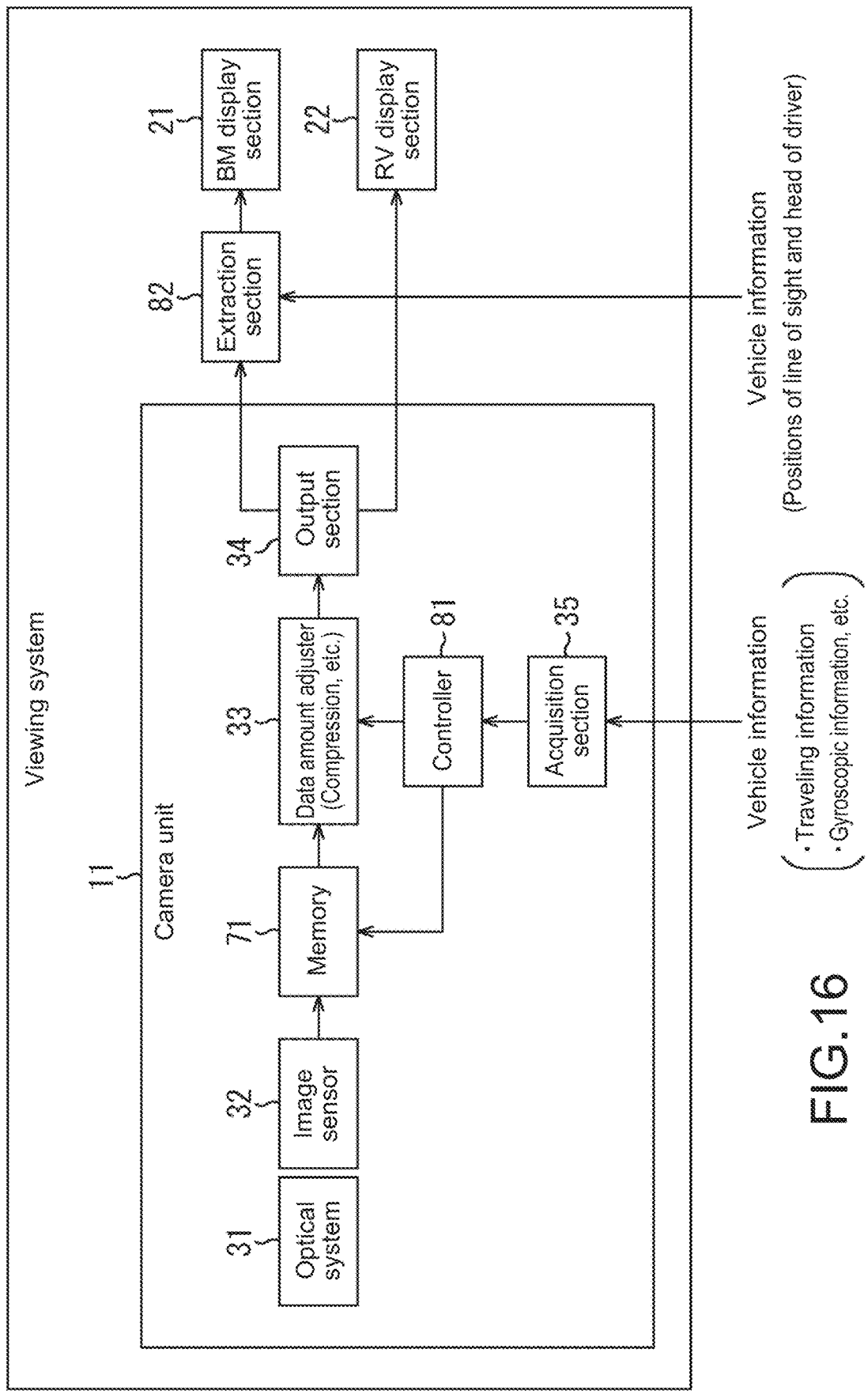
FIG. 16 is a block diagram illustrating a fourth example of the configuration of the viewing system included in the vehicle 10.

FIG. 16 is a block diagram illustrating a fourth example of the configuration of the viewing system included in the vehicle 10.

Note that, in the figure, a portion corresponding to that in FIG. 12 or 13 is denoted by the same reference numeral as FIG. 12 or 13, and a description thereof is omitted below. Examples of vehicle information acquired by the acquisition section 35 include traveling information, the specifications of the BM display section 21 and the RV display section 22, and gyroscopic information. Note that the positions of the line of sight and the head of a driver of the vehicle 10 are input to the extraction section 82 as a portion of the vehicle information.

In FIG. 16, the viewing system includes the camera unit 11, the BM display section 21, the RV display section 22, and the extraction section 82, and the camera unit 11 includes the optical system 31, the image sensor 32, the data amount adjuster 33, the output section 34, the acquisition section 35, the memory, and the controller 81.

Thus, the viewing system of FIG. 16 is similar to the viewing system of FIG. 13 in including the camera unit 11, the BM display section 21, the RV display section 22, and the extraction section 82, and in that the camera unit 11 includes the components from the optical system 31 to the acquisition section 35, and the controller 81.

However, the viewing system of FIG. 16 is different from the viewing system of FIG. 13 in newly including the memory 71 of FIG. 12.

In the viewing system of FIG. 16, processing similar to the processing performed in the viewing system of FIG. 13 is performed, except that the memory 71 stores therein a highest-resolution image (a highest-resolution captured image) from the image sensor 32 and an extraction control is performed with respect to the memory 71, not with respect to the image sensor 32, as in the case of the viewing system of FIG. 12.

<Description of Computer to Which Present Technology is Applied>

Next, the series of processes performed by the controllers 36 and 81, the data amount adjuster 33, and the extraction section 82 described above can be performed using hardware or software. When the series of processes is performed using software, a program included in the software is installed on, for example, a general-purpose computer.

Figure 17:
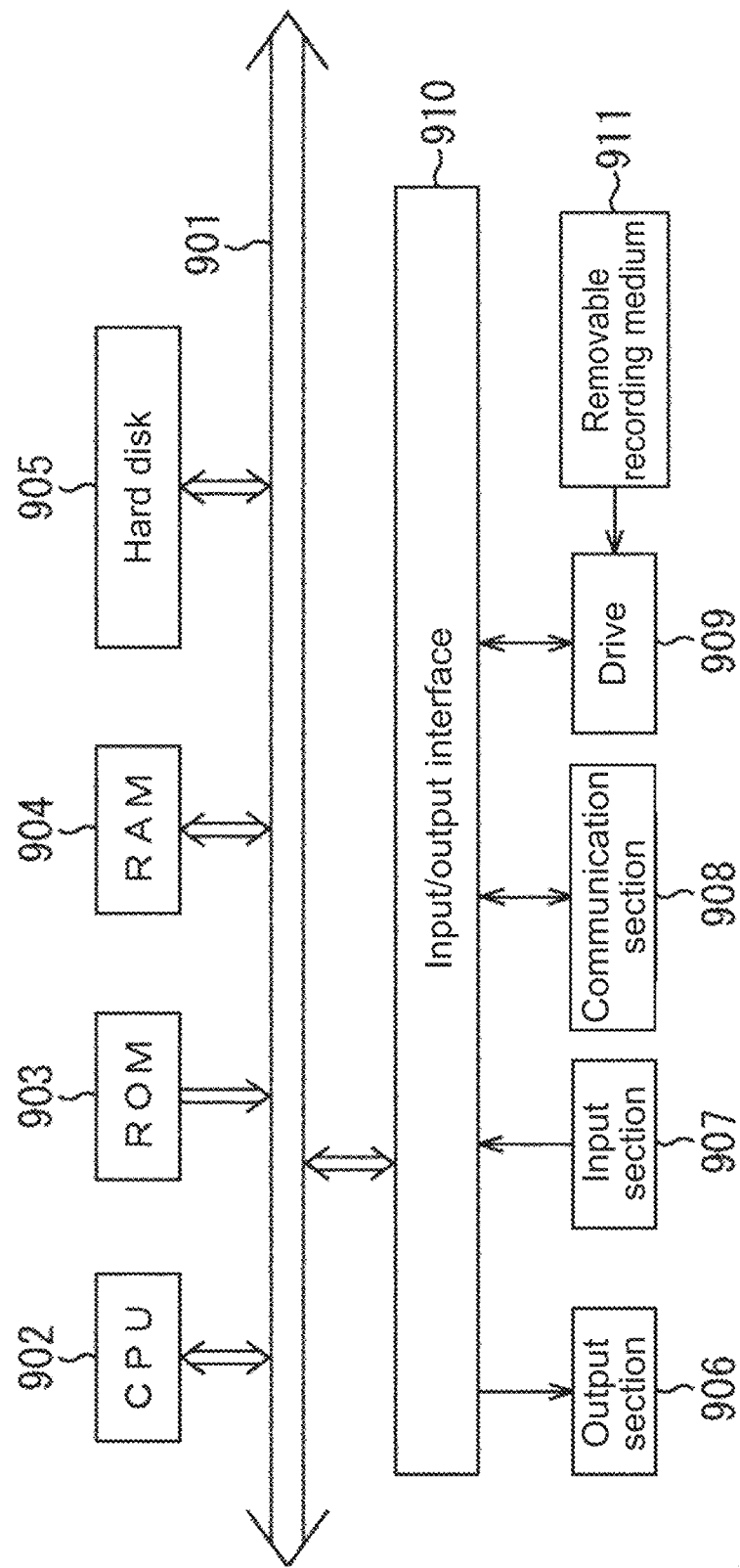
FIG. 17 is a block diagram illustrating an example of a configuration of an embodiment of a computer to which the present technology is applied.

FIG. 17 is a block diagram illustrating an example of a configuration of an embodiment of a computer on which a program used to perform the series of processes described above is installed.

The program can be recorded in advance in a hard disk 905 or a read only memory (ROM) 903 that is a recording medium included in the computer.

Alternatively, the program can be stored (recorded) in a removable recording medium 911 driven by a drive 909. Such a removable recording medium 911 can be provided as so-called package software. Here, examples of the removable recording medium 911 include a flexible disk, a compact disc read-only memory (CD-ROM), a magneto-optical (MO) disk, a digital versatile disc (DVD), a magnetic disk, and a semiconductor memory.

Note that, in addition to being installed on the computer from the removable recording medium 911 described above, the program can be downloaded to the computer through a communication network or a broadcast network to be installed on the hard disk 905 included in the computer. In other words, for example, the program can be wirelessly transferred to the computer from a download site through a satellite for digital satellite broadcasting, or can be transferred to the computer by wire through a network such as a local area network (LAN) or the Internet.

The computer includes a central processing unit (CPU) 902, and an input/output interface 910 is connected to the CPU 902 through a bus 901.

When a command is input by a user operating an input section 907 through the input/output interface 910, the CPU 902 executes a program stored in the ROM 903 according to the input command. Alternatively, the CPU 902 loads a program stored in the hard disk 905 into a random access memory (RAM) 904 and executes the program.

This results in the CPU 902 performing the processing according to the flowcharts described above or the processing performed on the basis of the configurations of the block diagrams described above. Then, for example, as necessary, the CPU 902 outputs a result of the processing using an output section 906 or transmits the processing result using a communication section 908 through the input/output interface 910, and the CPU 902 further records the processing result in the hard disk 905.

Note that the input section 907 includes, for example, a keyboard, a mouse, and a microphone. Further, the output section 906 includes, for example, a liquid crystal display (LCD) and a speaker.

Here, in the specification, the processes performed by a computer in accordance with a program does not necessarily have to be chronologically performed in the order of the descriptions in the flowcharts. In other words, the processes performed by a computer in accordance with a program include processes performed in parallel or individually (for example, parallel processing or processing performed using an object).

Further, the program may be a program on which processing is performed by a single computer (processor) or may be a program on which distributed-processing is performed by a plurality of computers. Furthermore, the program may be transferred to a remote computer to be executed by the remote computer.

Further, the system as used herein refers to a collection of a plurality of components (such as apparatuses and modules (parts)) and it does not matter whether all of the components are in a single housing. Thus, a plurality of apparatuses accommodated in separate housings and connected to one another via a network, and a single apparatus in which a plurality of modules is accommodated in a single housing are both the system.

Note that the embodiment of the present technology is not limited to the examples described above, and various modifications may be made thereto without departing from the scope of the present technology.

For example, the present technology may also have a configuration of cloud computing in which a single function is shared to be cooperatively processed by a plurality of apparatuses via a network.

Further, the respective steps described using the flowcharts described above may be shared to be performed by a plurality of apparatuses, in addition to being performed by a single apparatus.

Moreover, when a single step includes a plurality of processes, the plurality of processes included in the single step may be shared to be performed by a plurality of apparatuses, in addition to being performed by a single apparatus.

Note that the effects described herein are not limitative but are merely illustrative, and other effects may be provided.

Note that the present technology may take the following configurations.

<1> An image-capturing apparatus, including:
    an image sensor that performs image-capturing;
    a controller that performs an extraction control for extracting a first image and a second image from a captured image captured by the image sensor, the first image being displayed on a first display section, the second image being displayed on a second display section; and
    a data amount adjuster that adjusts data amounts of the first image and the second image according to vehicle information acquired from a vehicle.

<2> The image-capturing apparatus according to <1>, in which
    the controller performs a control of reading of data from the image sensor as the extraction control.

<3> The image-capturing apparatus according to <1>, in which
    the controller performs a control of reading of data from a storage as the extraction control, the storage storing therein the captured image output by the image sensor.

<4> The image-capturing apparatus according to any one of <1> to <3>, in which
    the controller performs the extraction control according to the vehicle information.

<5> The image-capturing apparatus according to <4>, in which
the vehicle information includes a traveling direction of the vehicle, and
when the traveling direction of the vehicle is a forward direction, the controller restricts the extraction of the second image from the captured image.

<6> The image-capturing apparatus according to <4>, in which
the vehicle information includes a position of a line of sight or a head of a driver of the vehicle, and
according to the position of the line of sight or the head of the driver of the vehicle, the controller controls a region extracted from the captured image as the first image.

<7> The image-capturing apparatus according to any one of <1> to <6>, in which
the data amount adjuster adjusts the data amount of the second image by restricting output of the second image.

<8> The image-capturing apparatus according to any one of <1> to <7>, in which
the data amount adjuster adjusts the data amount of the first image by compressing the first image, or the data amount of the second image by compressing the second image.

<9> The image-capturing apparatus according to any one of <1> to <3>, further including
an extraction section that extracts a region that is a portion of the first image as an image to be displayed on the first display image, according to a position of a line of sight or a head of a driver of the vehicle.

<10> The image-capturing apparatus according to any one of <1> to <9>, in which
the vehicle information includes a traveling direction or a vehicle speed of the vehicle.

<11> The image-capturing apparatus according to any one of <1> to <10>, in which
the first display section is a display section that is an alternative to a Class I mirror.

<12> The image-capturing apparatus according to any one of <1> to <11>, in which
the first image is an image of a region situated further rearward than a region just behind the rear of the vehicle.

<13> The image-capturing apparatus according to any one of <1> to <12>, in which
the second image is an image of a region just behind the rear of the vehicle.

<14> An image processing method, including:
performing an extraction control for extracting a first image and a second image from a captured image captured by an image sensor that performs image-capturing, the first image being displayed on a first display section, the second image being displayed on a second display section; and
adjusting data amounts of the first image and the second image according to vehicle information acquired from a vehicle.

<15> A program that causes a computer to operate as a controller and a data amount adjuster,
the controller performing an extraction control for extracting a first image and a second image from a captured image captured by an image sensor that performs image-capturing, the first image being displayed on a first display section, the second image being displayed on a second display section,
the data amount adjuster adjusting data amounts of the first image and the second image according to vehicle information acquired from a vehicle.

REFERENCE SIGNS LIST 10 vehicle
11 camera unit
21 BM display section
22 RV display section
23 in-vehicle camera
31 optical system
32 image sensor
33 data amount adjuster
34 output section
35 acquisition section
36 controller
51 pixel
52 AD converter
53 line memory
71 memory
81 controller
82 extraction section
901 bus
902 CPU
903 ROM
904 RAM
905 hard disk
906 output section
907 input section
908 communication section
909 drive
910 input/output interface
911 removable recording medium

The invention claimed is:

1. An image-capturing apparatus, comprising:
an image sensor that performs image-capturing;
a controller that performs an extraction control for extracting, from a captured image captured by the image sensor, a first image and a second image, the first image being displayed on a first display section, the second image being displayed on a second display section; and
circuitry configured to function as a data amount adjuster that adjusts data amounts of the first image and the second image according to vehicle information acquired from a vehicle,
wherein the first display section and the second display section are structurally separate,
wherein the data amount adjuster adjusts the data amount of the second image by restricting output of the second image such that the second image is not outputted.

2. The image-capturing apparatus according to claim 1, wherein the controller performs a control of reading of data from the image sensor as the extraction control.

3. The image-capturing apparatus according to claim 1, wherein the controller performs a control of reading of data from a storage as the extraction control, the storage storing therein the captured image output by the image sensor.

4. The image-capturing apparatus according to claim 1, wherein the controller performs the extraction control according to the vehicle information.

5. The image-capturing apparatus according to claim 4, wherein the vehicle information includes a traveling direction of the vehicle, and when the traveling direction of the vehicle is a forward direction, the controller restricts the extraction of the second image from the captured image.

6. The image-capturing apparatus according to claim 4, wherein the vehicle information includes a position of a line of sight or a head of a driver of the vehicle, and according to the position of the line of sight or the head of the driver of the vehicle, the controller controls a region extracted from the captured image as the first image.

7. The image-capturing apparatus according to claim 1, wherein the data amount adjuster adjusts the data amount of the first image by compressing the first image, or the data amount of the second image by compressing the second image.

8. The image-capturing apparatus according to claim 1, further comprising an extraction section that extracts a region that is a portion of the first image as an image to be displayed on the first display image, according to a position of a line of sight or a head of a driver of the vehicle.

9. The image-capturing apparatus according to claim 1, wherein the vehicle information includes a traveling direction or a vehicle speed of the vehicle.

10. The image-capturing apparatus according to claim 1, wherein the first display section is a display section that is an alternative to a Class I mirror.

11. The image-capturing apparatus according to claim 1, wherein the first image is an image of a region situated further rearward than a region just behind the rear of the vehicle.

12. The image-capturing apparatus according to claim 1, wherein the second image is an image of a region just behind the rear of the vehicle.

13. An image processing method, comprising:
performing an extraction control for extracting, from a captured image captured by an image sensor that performs image-capturing, a first image and a second image,
the first image being displayed on a first display section,
the second image being displayed on a second display section; and
adjusting data amounts of the first image and the second image according to vehicle information acquired from a vehicle,
wherein the first display section and the second display section are structurally separate,
wherein adjusting the data amounts includes adjusting the data amount of the second image by restricting output of the second image such that the second image is not outputted.

14. A non-transitory storage medium encoded with instructions that, when executed by a computer, execute a method comprising:
performing an extraction control for extracting, from a captured image captured by an image sensor that performs image-capturing, a first image and a second image,
the first image being displayed on a first display section,
the second image being displayed on a second display section; and
adjusting data amounts of the first image and the second image according to vehicle information acquired from a vehicle,
wherein the first display section and the second display section are structurally separate,
wherein adjusting the data amounts includes adjusting the data amount of the second image by restricting output of the second image such that the second image is not outputted.

* * * * *